United States Patent
Su

(10) Patent No.: US 9,329,696 B2
(45) Date of Patent: *May 3, 2016

(54) OPTIMIZED DIGITAL OPERATIONAL ENCODING AND INPUT METHOD OF WORLD CHARACTER INFORMATION AND INFORMATION PROCESSING SYSTEM THEREOF

(76) Inventor: Rongbin Su, Yulin (CN)

(*) Notice: Subject to any disclaimer, the term of this patent is extended or adjusted under 35 U.S.C. 154(b) by 795 days.

This patent is subject to a terminal disclaimer.

(21) Appl. No.: 13/555,817

(22) Filed: Jul. 23, 2012

(65) Prior Publication Data

US 2012/0287046 A1     Nov. 15, 2012

Related U.S. Application Data

(63) Continuation of application No. 10/516,736, filed as application No. PCT/CN03/00441 on Jun. 5, 2003, now Pat. No. 8,276,066.

(30) Foreign Application Priority Data

Jun. 5, 2002  (CN) .................................. 02 1 20916

(51) Int. Cl.
  *G06F 17/22*   (2006.01)
  *G06F 3/01*    (2006.01)
  (Continued)

(52) U.S. Cl.
  CPC .............. *G06F 3/018* (2013.01); *G06F 3/0233* (2013.01); *G06F 3/0238* (2013.01); *G06F 3/04886* (2013.01)

(58) Field of Classification Search
  CPC .............. G06F 3/018; G06F 17/30669; G06F 17/2863; G06F 3/0233; G06F 3/0238; G06F 3/04886; G06K 9/222
  See application file for complete search history.

(56) References Cited

U.S. PATENT DOCUMENTS

| 4,012,599 A | 3/1977 | Meyer |
| 4,868,913 A | 9/1989 | Tse-Kai |

(Continued)

FOREIGN PATENT DOCUMENTS

| CN | 1211002 A | 3/1999 |
| CN | 1335551 A | 2/2002 |

(Continued)

OTHER PUBLICATIONS

International Search Report (PCT/ISA/210) issued on Oct. 10, 2003, by the Chinese Patent Office as the International Searching Authority for International Application No. PCT/CNO3/00441.

(Continued)

*Primary Examiner* — Wilson Tsui

(74) *Attorney, Agent, or Firm* — Buchanan Ingersoll & Rooney PC

(57) ABSTRACT

Optimized digital operational encoding and input method of world character information and information processing system thereof are directed to digital operational encoding of the world character information with ten numerals 0-9 unifiedly by means of the encoding method operated with addition and subtraction by areas and positions. The method and device takes these number codes as the index codes of retrieving the literatures of world characters and the computer input codes of world characters, so as to build up a complete set of method and systems capable of using world character to design the operating system, computer language, chip instruction, wireless interface protocol, and wireless internet protocol, used widely for computer, communications, network system, and the sorting and retrieving system of world character codes.

2 Claims, 9 Drawing Sheets

| 1 | 2 abcd | 3 efg |
|---|---|---|
| 4 hijk | 5 lmn | 6 opq |
| 7 rst | 8 uvw | 9 xyz |
|  | 0 |  |

(51) Int. Cl.
*G06F 3/023* (2006.01)
*G06F 3/0488* (2013.01)

(56) References Cited

U.S. PATENT DOCUMENTS

| | | | |
|---|---|---|---|
| 4,949,260 A * | 8/1990 | Hsu | 715/264 |
| 5,109,352 A * | 4/1992 | O'Dell | 715/262 |
| 5,197,810 A | 3/1993 | Zhang et al. | |
| 5,307,267 A * | 4/1994 | Yang | 715/210 |
| 5,572,668 A * | 11/1996 | See et al. | 714/38.1 |
| 5,790,055 A | 8/1998 | Yu | |
| 5,812,171 A | 9/1998 | Kim | |
| 6,005,498 A | 12/1999 | Yang et al. | |
| 6,054,941 A | 4/2000 | Chen | |
| 6,249,908 B1 * | 6/2001 | Stamm | 717/113 |
| 6,389,166 B1 | 5/2002 | Chang et al. | |
| 6,490,563 B2 | 12/2002 | Hon et al. | |
| 6,922,811 B1 | 7/2005 | Leung et al. | |
| 7,213,202 B1 * | 5/2007 | Kagle | 715/235 |
| 2001/0029455 A1 * | 10/2001 | Chin et al. | 704/277 |
| 2002/0152258 A1 * | 10/2002 | Zhou | 709/201 |
| 2002/0173335 A1 | 11/2002 | Liang | |

FOREIGN PATENT DOCUMENTS

| | | |
|---|---|---|
| CN | 1378124 A | 11/2002 |
| DE | 101 05 312 A1 | 1/2002 |
| EP | 1 085 401 A1 | 3/2001 |
| GB | 2 158 626 A | 11/1985 |
| WO | WO 98/33111 A1 | 7/1998 |
| WO | WO 01/91421 A2 | 11/2001 |
| WO | WO 01/93180 A1 | 12/2001 |

OTHER PUBLICATIONS

Supplementary European Search Report in corresponding Application No. 03737844.5-1527 dated Jan. 10, 2007.
Office Action in ID W0020050031 dated Oct. 31, 2006, and an English Translation thereof.
Geschwinde et al., "PostgreSQL Developer's Handbook", publisher: Sams, published: Dec. 2001, p. 478.

* cited by examiner

| code | name of stroke | direction of stroke | stroke and its variables |
|---|---|---|---|
| 1 | horizontal | left → right | — — ╱ |
| 2 | vertical | top → bottom | │ |
| 3 | left-falling | top right → bottom left | ノ |
| 4 | dot | top left → bottom right | ╲ |
| 5 | hook | turning | 乙 |

Fig. 1

|  | horizontal 1 | vertical 2 | left-falling 3 | dot 4 | hook 5 |
|---|---|---|---|---|---|
| horizontal 1 | 二 2 | 十 3 | 厂 4 | 宀 5 | 匚 6 |
| vertical 2 |  | 川 4 | 斤 5 | ㅏ 6 | ㅁ 7 |
| left-falling 3 |  |  | 彡 6 | 八 7 | 几 8 |
| dot 4 |  |  |  | 丶丶 8 | 厶 9 |
| hook 5 |  |  |  |  | 了 0 |

Fig. 2

| 1 | 2<br>abcd | 3<br>efg |
|---|---|---|
| 4<br>hijk | 5<br>lmn | 6<br>opq |
| 7<br>rst | 8<br>uvw | 9<br>xyz |
|  | 0 |  |

Fig. 3

| 0<br>ab |  |  |
|---|---|---|
| 1<br>cd | 4<br>jk | 7<br>rst |
| 2<br>efg | 5<br>lmn | 8<br>uvw |
| 3<br>hi | 6<br>opq | 9<br>xyz |

Fig. 4

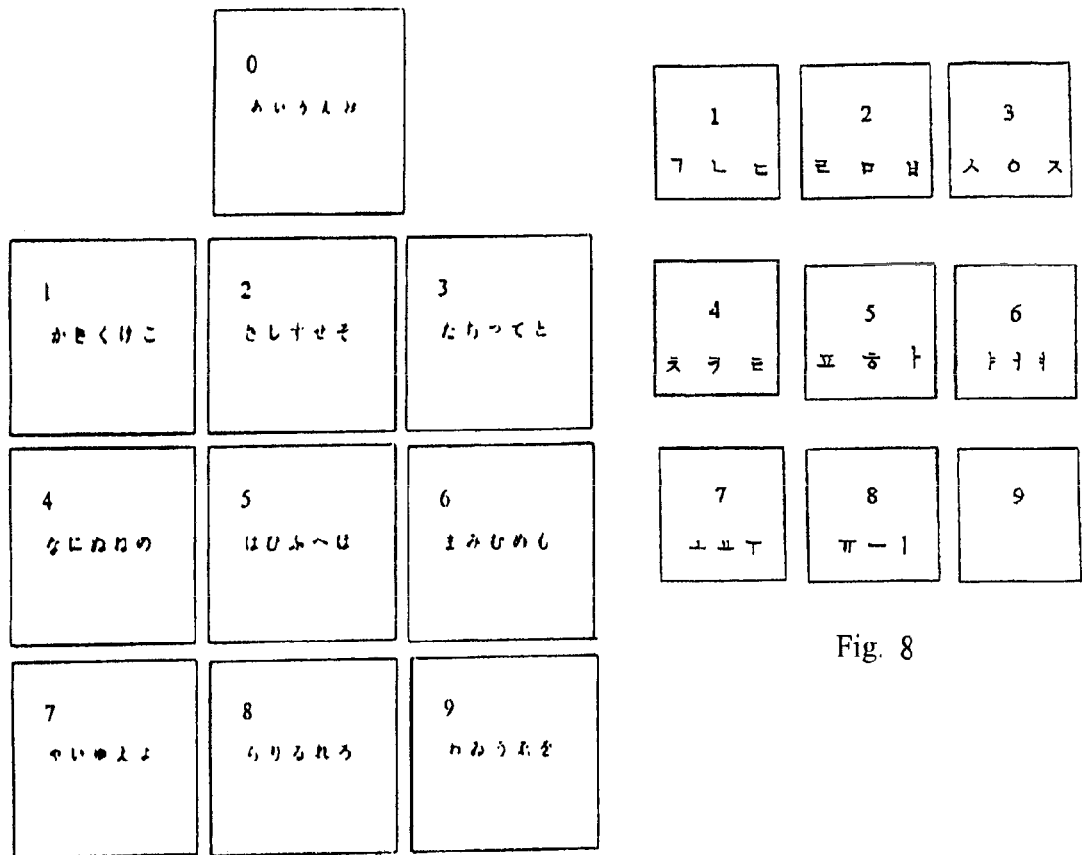
Fig. 7
Fig. 8
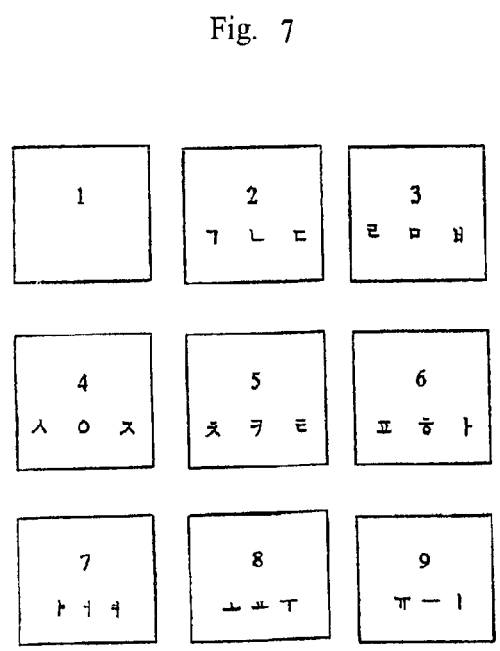
Fig. 9
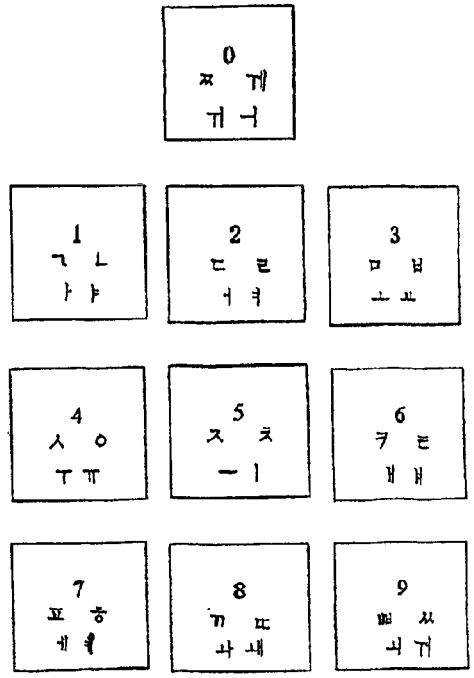
Fig. 10

| Korean alphabets | ㅇ ㅊ | ㅡ ㄹ | ㅣ ㅎ | ㅏ ㅓ ㅗ ㅜ | ㅑ ㅕ ㄱ ㄴ | ㅛ ㅠ | ㄷ ㅋ | ㅅ ㄹ | ㅁ ㅂ | ㅈ ㅍ |
|---|---|---|---|---|---|---|---|---|---|---|
| code | 0 | 1 | 2 | 3 | 4 | 5 | 6 | 7 | 8 | 9 |

Fig. 11

| 1<br>Aa Bb<br>Cc Dd | 2<br>Ee Ff<br>Gg | 3<br>Hh Ii<br>Jj Kk |
|---|---|---|
| 4<br>Ll Mm<br>Nn | 5<br>Oo Pp<br>Qq | 6<br>Rr Ss |
| 7<br>Uu Vv<br>Ww | 8<br>Xx Yy<br>Zz | 9 |

Fig. 12

| 1 | 2<br>Aa Bb<br>Cc | 3<br>Dd Ee<br>Ff |
|---|---|---|
| 4<br>Gg Hh<br>Ii | 5<br>Jj Kk<br>Ll | 6<br>Mm Nn<br>Oo |
| 7<br>Pp Qq<br>Rr Ss | 8<br>Tt Uu<br>Vv | 9<br>Ww Xx<br>Yy Zz |

Fig. 13

| 1<br>Aa Bb Cc<br>Dd ch á | 2<br>Ee Ff<br>Gg | 3<br>Hh Ii<br>Jj Kk |
|---|---|---|
| 4<br>Ll Mm<br>Nn Nn | 5<br>Oo Pp<br>Qq | 6<br>Rr Ss<br>Tt |
| 7<br>Uu Vv<br>Ww | 8<br>Xx Yy<br>Zz | 9 |

Fig. 14

| 1 | 2<br>Aa Bb<br>Cc Ch á | 3<br>Dd Ee<br>Ff |
|---|---|---|
| 4<br>Gg Hh Ii<br>í | 5<br>Jj Kk Ll<br>Ll ll | 6<br>Mm Nn<br>Nn Oo |
| 7<br>Pp Qq Rr<br>Ss | 8<br>Tt Uu<br>Vv ù | 9<br>Ww Xx<br>Yy Zz |

Fig. 15

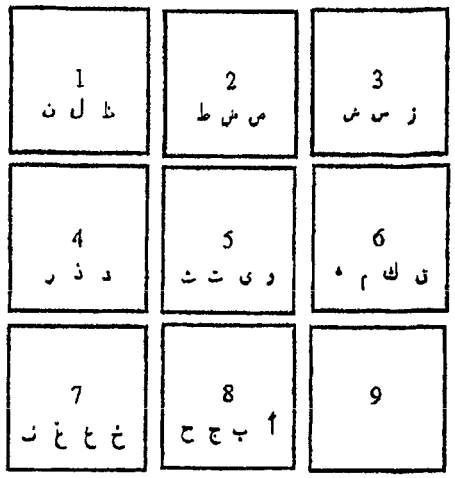
Fig. 24
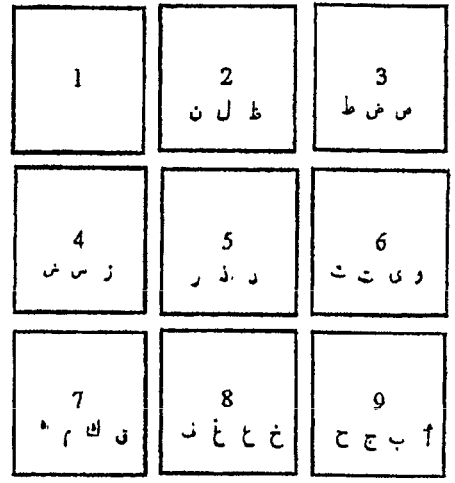
Fig. 25
| (the state column) | (the state column) | (the state column) | |
|---|---|---|---|
| 中 | 中 | 文 | |
| (text edit column)<br>(the candidate character column)<br>↓ | (text edit column)<br>(the candidate character column)<br>↓ | (text edit column)<br>(the candidate character column)<br>(the code input box) ↓ | (prompt column)<br>↓ |
| zhong   1.中 2.钟 3.忠 4.终 5. | zhong   1.中 2.钟 3.忠 4.终 5. | 57 | 1.文 2.六 |
| 881 | 1.zhong 2.zhie 3.chong | 881 | 1.zhong 2.zhie 3.chong |
Fig. 27             Fig. 28

| name | full stop | hyphen | dash | comma | caesura sign | separation mark | emphasis mark | ellipsis | exclamation mark | semicolon | colon | question mark |
|---|---|---|---|---|---|---|---|---|---|---|---|---|
| symbol | . | - | — | , | 、 | · | · | …… | ! | ; | : | ? |
| code | 0 | 1 | 1 | 3 | 4 | 4 | 4 | 4 | 6 | 7 | 8 | 9 |

| name | single book-title mark | | double book-title mark | | vertical single quotation mark | | vertical double quotation mark | | horizontal double quotation mark | | horizontal single quotation mark | | bracket | | hollowed square bracket | | solid square bracket | |
|---|---|---|---|---|---|---|---|---|---|---|---|---|---|---|---|---|---|---|
| symbol | 〈 | 〉 | 《 | 》 | 「 | 」 | 『 | 』 | " | " | ' | ' | ( | ) | 〔 | 〕 | 【 | 】 |
| code | 5 | 5 | 0 | 0 | 5 | 5 | 0 | 0 | 8 | 6 | 4 | 3 | 4 | 3 | 0 | 9 | 0 | 9 |

Fig. 26

OPTIMIZED DIGITAL OPERATIONAL ENCODING AND INPUT METHOD OF WORLD CHARACTER INFORMATION AND INFORMATION PROCESSING SYSTEM THEREOF

CROSS REFERENCE TO RELATED APPLICATIONS

The present application is a continuation of U.S. Ser. No. 10/516,736, filed on Dec. 6, 2004, which is a national stage of International Application No. PCT/CN2003/000441, filed on Jun. 5, 2003, and which claims priority of Chinese Patent Application No. 02120916.2, filed on Jun. 5, 2002. The entire contents of which is incorporated herein in their entirety by reference.

FIELD OF THE INVENTION

Optimized digital operational encoding and input method of world character information and its information processing system are directed to digital encoding and processing technology of world characters. It relates to a digital encoding and input method of world character information and relevant information processing system, more specifically, to the input method through encoding the world characters by numerals as well as the relevant information processing system thereof.

BACKGROUND OF THE INVENTION

The current situation of digital encoding and processing technology of world character information is discussed below.

The digital encoding technology of world character information is a historically significant task worldwide, and all countries in the world are carrying out the research of this task and setting forth thousands of solutions, each of which has its own advantages but shortcomings still exist, for example, no unified standard, easy to learn but hard to use, or easy to use but hard to learn, etc.

In regard to the initial solution for digital operational encoding and input method of world characters and information processing system thereof (PCT/CN01/00687), it could not input characters nor retrieve words in a more simple and higher efficient way because it lacks the operational encoding and input method of Chinese sentences, nor the operational encoding and input method of Simplified spelling of the words of linear characters; The input of the Japanese word, Kanji character, and Japanese Roman word has to switch among different states and the input of the codes could not be implemented under the same state; the settings of the numerical pad still could not change the situation that the numerical pad has to be used with the coordination of keyboard and mouse during the input and edition of characters, and the numerical pad could not be used separately; and the conflict between the simplicity and the high efficiency of world character information encoding processing could not be solved in an effective way.

SUMMARY OF THE INVENTION

The object of the present invention is to use 10 numerals 0-9 in a unified manner to perform digital operational encoding processing to the world character information, and solve the conflict between the simplicity and the high efficiency for encoding the world character information in an effective way.

In order to achieve the aforesaid object of the invention, according to a first aspect of the invention, there is provided an encoding and input method of the world characters, which is used to encode the world characters and input them into a computer device, said computer device comprising a keyboard equipped with standard keyboard function and mouse function. Said method includes the follow steps: for each category of world characters, allocating some basic elements forming the character of this category or capable of determining the character of this category to the corresponding number keys on the numerical pad, the code of said each basic element is uniquely determined by area code and/or position code, where said area code is the number of the key at which the element is located, said position code is the position number in the number keys to which the basic element pertains; selecting the category of the characters to be inputted; for each character of the category to be inputted, splitting it as a combination of said several elements; arranging in order the codes corresponding to each element in said combination and taking them as the code of the character; and inputting the code of this character.

In a first aspect according to the present invention, said world characters are classified into block characters, linear characters, hybrid characters, and punctuations and symbols. As to the linear characters, said elements are the alphabets of said linear characters. Said block characters are classified as block ideograph character and block phonetic character. As to the block ideograph character, said basic elements may respectively comprise the basic strokes and the combinations thereof forming the glyph of said block ideograph character, the PinYin alphabets representing the pronunciation of the ideograph character, the basis strokes and the combinations thereof forming the glyph of said block ideograph character and the PinYin alphabets representing its pronunciation. As to the block phonetic character, said basic elements may respectively comprise the basic strokes and the combinations thereof forming the glyph of said block phonetic character, and the alphabets representing the pronunciation and forming the glyph of the block phonetic character. As to the hybrid character, said basic elements comprise the basic strokes and the combinations thereof forming the block ideograph character as well as the alphabets of the linear character.

Said block ideograph characters include the Chinese character for which said basic elements may respectively include the basic strokes and the combinations thereof forming the glyph of the Chinese character, the PinYin alphabets or the initial consonant and the final (simple or compound vowel) representing the pronunciation of the Chinese character, the basic strokes and the combinations thereof forming the glyph of Chinese character and the PinYin alphabets or the initial consonant and the final representing its pronunciation. Said block phonetic characters include the Korean character for which said basic elements respectively include the basic strokes and the combinations thereof forming the glyph of the Hanja character, the Korean alphabets forming the Korean character, and the Korean alphabets representing the Korean pronunciation of the Hanja character. Said linear characters include English, French, German, Italian, Spanish, Russian, Greek, and Arabic. Said basic elements include the alphabets forming English, French, German, Italian, Spanish, Russian, Greek, and Arabic respectively. Said hybrid characters include Japanese for which the basic elements may include the basic strokes and the combinations thereof forming the glyph of the Kanji characters, the kana forming Japanese characters, and the kana representing the Japanese pronunciation of the Kanji characters.

Preferably, the basic strokes, the combinations thereof, and their codes can be determined by the Chinese glyph and by the following method: the Chinese strokes can be classified into five basic strokes, i.e., horizontal, vertical, left-falling, dot, and hook, which are defined with codes of 1, 2, 3, 4, and 5 respectively, thus forming the basic stroke codes. The encoding for a combination of two strokes is formed by combining any two strokes of the horizontal, vertical, left-falling, dot, and hook, adding their respective stroke codes of each combination, and performing the operation of subtracting ten if the sum is equal to or over ten. The encoding for a combination of three strokes is formed by combining any three strokes of the horizontal, vertical, left-falling, dot, and hook, adding the numbers of their respective stroke codes of each combination, and performing the operation of subtracting ten if the sum is equal to or over ten. For the combinations of more than three strokes, the encoding is formed by adding the numbers of their respective stroke codes of the combination, and performing the operation of subtracting ten if the sum is equal to or over ten.

Preferably, when encoding the Chinese character by the PinYin alphabets of the Chinese character, said basic elements are the PinYin alphabets representing the pronunciation of the Chinese character and tone thereof, wherein the codes of the Chinese character are formed by the area codes of the PinYin alphabets representing the pronunciation of the Chinese character and the tone codes, and wherein said tone codes correspond to four different numbers which are selected from 0-9, representing the tones of the Chinese characters.

Preferably, when encoding the Chinese character by the pronunciation of the Chinese character, said basic elements are the initial consonant and the final of the alphabets representing the pronunciation of the Chinese character, wherein the code of the Chinese character is formed by the area code and the position code in sequence of the initial consonant and the final representing the pronunciation of the Chinese character.

Preferably, when encoding the Chinese character with the glyph and pronunciation of the Chinese character, said basic elements include the initial consonant and the final representing the pronunciation of the Chinese character, and the basic strokes of the Chinese character and the combinations thereof, wherein the area and position codes of the initial consonant and the final, the basic strokes and the combinations thereof are determined respectively, the area and position codes of the initial consonant and the final can use the same numbers as those of the basic strokes and the combinations thereof.

Preferably, as to the Japanese character, said basic elements can include the kana forming the Japanese characters, the kana representing the Japanese pronunciation of Kanji characters, and alphabets of the Japanese Roman words. The kana forming the Japanese characters, the kana representing the Japanese pronunciation of Kanji characters, and Japanese Roman words are encoded, and thus the code of the Japanese character is formed by the codes of the kana or alphabets in sequence.

Preferably, as to the Korean characters, said basic elements include the Korean alphabets forming the Korean character, and the Korean alphabets representing the Korean pronunciation of the Hanja character. The Korean alphabets are arranged sequentially in areas and the codes of the alphabets are formed by the area codes.

Preferably, as to the Korean characters, said basic elements are the Korean alphabets, and the area and position codes of the Korean alphabets are determined as follows:

Use ten numerals from 0 to 9 to classify the strokes of the Korean alphabets into five basic strokes, i.e., horizontal, vertical, left-falling, dot, and hook, which are defined with codes of 1, 2, 3, 4, and 5 respectively. After the stroke code numbers of the alphabets are added, the operation of subtracting ten if the sum is equal to or over ten is performed, the codes of the Korean alphabets are defined respectively as below: 0 for ㅇ、ㅈ, 1 for – and ㄹ 2 for l and ㅎ, 3 for ㅏ 、ㅓ ㅗ.ㅜ, 4 for ㅑ 、ㅕ, 5 for ㅛ 、ㅠ 、ㄱ 、ㄴ, 6 for ㄷ.ㅂ, 7 for ㅅ、ㅌ, 8 for ㅁ 、ㅂ, and 9 for ㅊ 、ㅍ.

Preferably, as to the linear characters, the codes of the alphabets can be formed by the area codes of its alphabets.

Preferably, as to the linear characters, the codes of the alphabets can be formed by the area codes and the position codes of its alphabets.

Preferably, as to the hybrid characters, the codes of the alphabets can be formed by the area codes of its alphabets.

In a second aspect according to the present invention, there is provided a method of sorting and retrieving the encoded world character and retrieving system, said method comprising the steps of: deriving the codes of the world character needed to be retrieved; deriving the position codes of the world character in index or prompt column; and searching the world character and its explanation needed to be retrieved in the text or the text column based on the location codes of the world character needed to be retrieved. Said retrieving system includes the retrieving systems for the electronic publishing and the press publishing.

In a third aspect according to the present invention, there is provided a programming method of the world character, said method comprising the steps of: using world characters, punctuations, symbols and numbers as the programming characters and programming based on the type, format, content and application of the computer language; encoding and inputting the world character by using the encoding and input method and its processing device according to the first aspect of the invention.

In a fourth aspect according to the present invention, there is provided a programming method of machine language, said method comprising the steps of: using world characters, numbers, punctuations and symbols to describe the task to be completed by the computer machine language; using any 4 decimal numerals to indicate the world characters, numbers, punctuations and symbols that describe the task to be completed by the machine language; or using 4 decimal numerals to encode the world characters, numbers, punctuations and symbols that indicate the task to be completed by the machine language based on the encoding method according to the first aspect of the invention, and supplementing with 0s to make a 4-digit code when the number of codes are less than 4; using the codes of 4 decimal numerals to indicate the world characters, numbers, punctuations and symbols that describe the task to be completed by the machine language; using 4 binary numbers to represent a decimal numeral and totally using 16 binary numbers to represent 4 decimal numerals.

In a fifth aspect according to the invention, there is provided a programming method of the assembly language, said method comprising the steps of: using world characters, numbers, punctuations, and symbols to describe the task to be completed by the computer assembly language; using any 4 decimal numerals to indicate the world characters, numbers, punctuations, and symbols that describe the task to be completed by the assembly language; or using the 4 decimal numerals to encode the world characters, numbers, punctuations, and symbols that describe the task to be completed by the assembly language based on the encoding method according to the first aspect of the invention, supplementing with 0s to make a 4-digit code when the code length are less than 4; using the codes of 4 decimal numerals to indicate world characters, numbers, punctuations, and symbols that describe the task to be accomplished by the assembly language;

In a sixth aspect according to the invention, there is provided a design method of computer chip instructions for world character, comprising the steps of: taking Chinese character, alphabets, punctuations, symbols and numbers as the instruction design symbols to indicate the task to be completed by the computer chip instructions; based on the encoding method according to the first aspect of the invention, using the codes of 4 decimal numerals to indicate a world character; and using 16 binary numbers 0 and 1 to represent the task to be completed by the computer chip.

In a seventh aspect according to the invention, there is provided a design method of computer operating system for world character, said method comprising the steps of: using graphs, world characters, alphabets, kana, punctuations, symbols and numbers as operators to design a computer operating system on the basis of the type, application and task of the computer operating system; using the world character to name a file and using this world character file name to access the memory address of the file in the disk; using the encoding and input method according to the first aspect of the invention to encode and input world characters regarding or regardless of the countries to which the characters pertain.

In an eighth aspect according to the invention, there is provided a design method of wireless interface protocol for the world character, said method comprising the steps of: using world characters, numbers, punctuations, symbols to indicate the task to be completed by the wireless interface protocol; encoding the world characters, numbers, punctuations, symbols that indicate the task to be completed by the wireless interface protocol; and inputting and processing the code of the world characters, numbers, punctuations, symbols that indicate the task to be completed by the wireless interface protocol.

In a ninth aspect according to the invention, there is provided a design method of wireless internet protocol for world character, said method comprising the steps of: using world characters, numbers, punctuations, symbols to indicate the task to be completed by the wireless internet protocol; encoding the world characters, numbers, punctuations, symbols that indicate the task to be completed by the wireless internet protocol; and inputting and processing the code of the world characters, numbers, punctuations, symbols that indicate the task to be completed by the wireless internet protocol.

BRIEF DESCRIPTION OF THE DRAWINGS

The advantages of the present invention will be more apparent by reference to the specific description of the embodiments in conjunction with the accompanying drawings, wherein:

FIG. 1 shows the names, codes, strokes, and direction of five basic strokes used by the present invention;

FIG. 2 shows 15 2-stroke combinations of five basic strokes and their codes;

FIG. 3 shows the distribution of PinYin alphabets in areas 1-8;

FIG. 4 shows the distribution of PinYin alphabets in areas 0-9;

FIG. 7 shows the distribution of Japanese kana in areas 0-9;

FIG. 8 shows the distribution of Korean alphabets in areas 1-8;

FIG. 9 shows the distribution of Korean alphabets in areas 0-9;

FIG. 10 shows the distribution of the Korean initial consonant and final alphabets in areas 0-9;

FIG. 11 shows the Korean alphabets and their codes;

FIG. 12 shows the distribution of English alphabets in areas 1-8;

FIG. 13 shows the distribution of English alphabets in area 0-9;

FIG. 14 shows the distribution of Spanish alphabets in areas 1-8;

FIG. 15 shows the distribution of Spanish alphabets in areas 0-9;

FIG. 24 shows the distribution of Arabic alphabets in areas 1-8;

FIG. 25 shows the distribution of Arabic alphabets in areas 0-9;

FIG. 26 shows the names of the punctuations, symbols, and their codes;

FIG. 27 shows the sorting of the retrieving system of electronic publishing type;

FIG. 28 shows the settings of a monitor settings; and

MODE OF CARRYING OUT THE INVENTION

Figures 5, 6:
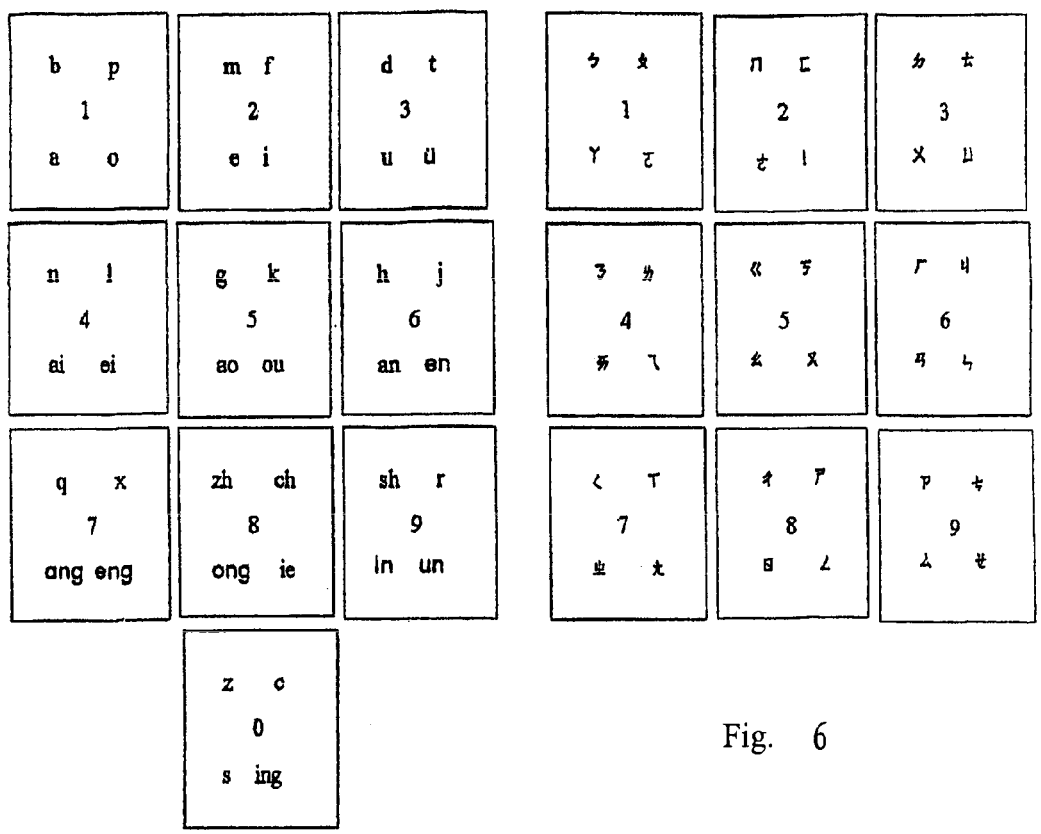
FIG. 5 shows the distribution of the initial consonants and finals of PinYin in areas 0-9.
FIG. 6 shows the distribution of the alphabets of Chinese phonetic notation in areas 1-9.

The optimized digital encoding and input schemes of world character information and the information processing system according to the invention comprise the following: a digital operational encoding and input method of world character information and its processing device; a sorting and retrieving method of world characters encoded and its retrieving system; a programming method of the world character and its execution manner; a design method of computer chip instructions for world characters; a design method of wireless interface protocol for world character; and a design method of wireless internet protocol for world characters.

A digital operational encoding and input method of world character information and its processing device.

The digital operational encoding and input method of world character information and processing device thereof are described below.

The digital operational encoding and input method of world character information and the processing device thereof comprise: the digital operational encoding and input method of world character information, the world character information digital operational encoding and input processing device.

1. The digital operational encoding and input method of world character information The digital operational encoding and input method of world character information includes: the digital operational encoding method of world character information, and the digital input method of world character information.

1.1. The digital operational encoding method of world character information

The digital operational encoding method of world character information is as follows: based on the glyph (i.e., the graph information of character) and pronunciation (i.e., the sound information of character) of world characters, with 10 numerals from 0 to 9, using the operational encoding methods of addition, subtraction and by areas and positions to encode the strokes and alphabets forming the glyph and representing the pronunciation of the world character, thus forming the code of the world character by combining the codes of the strokes, the code of the alphabets, or the alphabets. Based on the category of the world characters, the world characters are classified into block character, linear character, hybrid character, numeral, punctuation and symbol for digital operational encoding.

1.1.1. Digital operational encoding method of the block character

The block character includes the block ideograph character and the block phonetic character, the typical ones of which are Chinese character and Korean character respectively.

The block ideograph character—the digital operational encoding method of Chinese character The block character—the Chinese character is formed by the strokes and the combinations thereof arranged at top, bottom, left, and right sides within a block. Its digital operational encoding method is as follows: according to the glyph and pronunciation of the Chinese character and with 10 numerals from 0 to 9, using the operational encoding methods of addition, subtraction, and by areas and positions to encode the strokes and the alphabets forming the glyph and representing the pronunciation of the Chinese character respectively, thus forming the code of the Chinese character by combining the codes of the strokes, the alphabets, or the code of the alphabets.

(1). The digital operational encoding method of Chinese character by the glyph of Chinese character According to the glyph of Chinese character, the digital operational encoding method is as follows: according to the glyph of Chinese characters, classifying the strokes forming Chinese character into five basic strokes, i.e., horizontal (—), vertical (|), left-falling ( ノ ), dot ( 丶 ), and hook ( ∠ ); defined them with the codes of 1, 2, 3, 4, and 5 respectively, and forming various "stroke combinations" with these five basic strokes; with 10 numerals 0-9, operate and encode these "stroke combinations" by addition and subtraction of their codes; adding the code number of the basic strokes forming the "stroke combinations" and performing the operation of subtracting ten if the sum is equal to or over ten on the summation result afterwards to get the code of the "stroke combinations"; according to the integrity principle of the orders of strokes in writing Chinese character, as well as the structure of the elements, taking the codes in an order from the combinations of more strokes to the combinations of less strokes, that is to say, taking firstly the code of "more than 3-stroke combination", then the code of "3-stroke combination", then "2-stroke combination", and finally the code of "one stroke", thus forming the code of the Chinese character. Each Chinese character shall take at most four codes and at least one code. When encoding, the Chinese characters are classified into and encoded with single character, phrase, and sentence.

① The encodings of "one stroke", "2-stroke combination", "3-stroke combination" and "more than 3-stroke combination" for addition and subtraction operation are described as follows:

A: the encoding of "one stroke":

Classifying the strokes of the Chinese character into five basic strokes, namely horizontal (—), vertical (|), left-falling ( ノ ), dot ( 丶 ), and hook ( 乙 ), the codes of which are correspondingly defined as 1, 2, 3, 4, and 5, thus forming the code of "one stroke" (as shown in FIG. 1).

B: the encoding of "2-stroke combination":

The combinations of any two of strokes horizontal (—), vertical (|), left-falling ( ノ ), dot ( 丶 ), and hook ( 乙 ) come to 15 results: horizontal and horizontal, horizontal and vertical, horizontal and left-falling, horizontal and dot, horizontal and hook, vertical and vertical, vertical and left-falling, vertical and dot, vertical and hook, left-falling and left-falling, left-falling and dot, left-falling and hook, dot and dot, dot and hook, hook and hook; the codes of the respective combinations after adding the code number of each stroke, and performing the operation of subtracting ten if the sum is equal to or over ten on the summation result are: 2, 3, 4, 5, 6; 4, 5, 6, 7; 6, 7, 8; 8, 9; 0, thus forming the codes of "2-stroke combinations" (as shown in FIG. 2).

C: the encoding of "3-stroke combinations":

The combinations of any three of five basic strokes: for 寸, 七, 尹, adding the code numbers of their combined strokes respectively, and performing the operation of subtracting ten if the sum is equal to or over ten, and get 0 as their codes; for 丬, 门, 己, 弓, 子, 纟, 马, adding the code numbers of their combined strokes respectively, and performing the operation of subtracting ten if the sum is equal to or over ten, and get 1 as their codes; for 夕, 夂, 冖, 小, adding the code numbers of their combined strokes respectively, and performing the operation of subtracting ten if the sum is equal to or over ten, and get 2 as their codes; for 忄, 乏, adding the code numbers of their combined strokes respectively, and performing the operation of subtracting ten if the sum is equal to or over ten, and get 3 as their codes; for 工, 土, 幺, adding the code numbers of their combined strokes respectively, and performing the operation of subtracting ten if the sum is equal to or over ten, and get 4 as their codes; for 艹, 巛, adding the code numbers of their combined strokes respectively, and performing the operation of subtracting ten if the sum is equal to or over ten, and get 5 as their codes; 6 as the code of 廾 after adding the code numbers of its combined strokes; for 扌, ヨ, adding the code numbers of their combined strokes respectively, and get 7 as their codes; for 大, 口, 彳, 广, adding the code numbers of their combined strokes respectively, and get 8 as their codes; for 尢, 忄, 巾, 山, 彡, 忄, 氵, 尸, 女, adding the code numbers of their combined strokes respectively, and get 9 as their codes; thus forming the codes of "3-stroke combinations".

D: the encoding of "more than 3-stroke combinations":

The combinations of more than three strokes of horizontal, vertical, left-falling, dot, and hook: for 木, 月, 钅, 火, 水, 日, adding the code numbers of their combined strokes respectively, and performing the operation of subtracting ten if the sum is equal to or over ten, and get 0, 0, 2, 4, 7, 9 respectively as their codes, thus forming the codes of "more than 3-stroke combination".

② Based on the aforementioned encodings of "one stroke" "2-stroke combination", "3-stroke combination" and "more than 3-stroke combination", the encoding methods for single Chinese character, phrase, and sentence are respectively as follows:

A: The encoding method of single character

The encoding method of single Chinese character performs encoding according to the classification of unified character (独体字) and composite character (合体字) of Chinese characters.

a. The encoding method of unified character

The encoding method of unified character is described as follows: using the first three codes and the last code of its strokes, taking four codes at most, one code at least for each unified character, and encoding depending on whether the number of the codes exceed 4.

I: The encoding method of unified character with no more than four codes (including four codes): taking all codes of the stroke combinations of the unified character sequentially to form the code of the character.

For example: as to character "中", where part "口" is encoded as 8, "丨" encoded as 2, so the code of "中" is 82.

II: The encoding method of unified character with more than four strokes: taking the first three codes and the last code sequentially to form the code of the character.

For example: as to character "粤", where the part "丿" is encoded as 3, "冂" as 7, " " as 7, "木" as 0, "一" as 1, and " " as 6, taking the first 3 codes and the last code, and the code of character "粤" is 3776.

b. The encoding method of composite character

The composite characters are generally formed by more than two "stroke combinations", and their encoding method is described as follows:

I. A composite character is split into radical and remaining parts; the radical and the remaining are encoded respectively, and the codes of the radical is combined with that of the remaining to form the code of the composite character; taking the first and the last code of the respective radical and remaining to form the code of the composite character. For each composite character, four codes can be taken at most, and two codes at least.

II. taking no more than two codes from the radical, and no more than three codes from the remaining. For "扌, 木, 氵, 土, 火, 日, 月" and the "stroke combinations" of no more than three strokes, one code is taken; for the "stroke combinations" of more than three strokes, two codes are taken. For each composite character, no more than four codes are taken, and the encoding is performed depending on whether the number of codes exceed 4.

For the encoding by taking of the radical and the remaining, according to the integrity principle of the orders of strokes in writing, as well as the structure of the elements, taking the codes in an order from the combinations of more strokes to that of less strokes, that is to say, taking firstly the code of "more than 3-stroke combinations": 扌, 木, 氵, 土, 火, 日, 月", then the code of "3-stroke combinations", then "2-stroke combinations", and finally the code of "one stroke".

III. Encoding the "stroke combinations" forming the radical and the remaining, and forming the codes of the radical and the remaining by the code of "stroke combinations". The encoding method of "stroke combinations" is as follows: with 10 numerals from 0-9, operational encoding the strokes to form the "stroke combinations" by addition and subtraction, i.e. adding the code number of the strokes and performing the operation of subtracting ten if the sum is equal to or over ten on the summation result to get the code of the "stroke combinations".

The encoding method of the composite character is based on whether number of codes of the radical and the remaining of the composite character exceed 4.

I: For the composite character with no more than four codes, the encoding method is as follows:

i. taking one code from the radical, one to three codes from the remaining, thus forming the code of the character.

For example: as to character "外", the radical "夕" is encoded as 2, while the remaining "卜" as 6, so the code of "外" is 26.

ii. taking two codes from the radical, one or two codes from the remaining, thus forming the code of the character.

For example: as to character "码", the radical "石" is encoded as 48, and the remaining "马" as 1, so the code of "码" is 481.

II: For the composite character with more than four codes, the encoding method is as follows:

i. taking one code from the radical, taking first two codes and the last code from the remaining, thus forming the code of the character.

For example: as to character "编", the radical "纟" is encoded as 1, while the remaining "扁" encoded as 9475, so the code of "编" is 1945.

ii. taking the first and the last code from the radical, taking the first and the last code from the remaining, thus forming the code of the character in writing sequence.

For example: as to character "数", the radical "攵" is encoded as 47, and the remaining "娄" as 709, so the code of "数" is 7947.

B: The encoding method of phrase

The encoding method of phrase is conducted depending on the character number contained in the phrase, for example, two characters, three characters, and multi-characters of more than three characters.

a. The encoding method of 2-character phrase: taking the first and last codes of each character, thus forming the code of the phrase.

For example: as to phrase "信息", "信" is encoded as 5528, and "息" encoded as 3288, so the code of phrase "信息" is 5838 by taking the first code and the last codes of the respective characters.

b. The encoding method of 3-character phrase: taking the first code of each of the first two characters, and the first and last code of the last character, thus forming the code of the phrase.

For example: as to phrase "数字化", "数", is encoded as 7947, "字" encoded as 21, and "化" as 58, so the code of phrase "数字化" is 7258.

c. The encoding method of multi-character phrase: encoding with the first code of each of the first three characters and the last characters with a total of four code, thus forming the code of the phrase in turn.

For example: as to phrase "中华人民共和国", "中" is encoded as 82, "华" as 583, "人" as 7, "国" as 8234, so the code of phrase "中华人民共和国" is 8578.

C: The encoding method of sentence

The encoding method of sentence is: taking the code of the first stroke combination of each single character forming the sentence, thus forming the code of the sentence in turn.

For example: as to sentence "我说个笑 话给你听", the code of the first stroke combination of "我" is 4, the first stroke combination of "说" is encoded as 9, the first stroke combination of "个" is encoded as 7, the first stroke combination of "笑" is encoded as 8, the first stroke combination of "话" is encoded as 9, the first stroke combination of "给" is encoded as 1, the first stroke combination of "你" is encoded as 5, the first stroke combination of "听" is encoded as 8, so the code of sentence "我说个笑话 给你听" is 49789158.

(2) The digital operational encoding method of Chinese character by the pronunciation of Chinese character According to the pronunciation of Chinese character, the encoding method is as follows: according to the pronunciation of Chinese character, with ten numerals from 0 to 9, using the operational encoding methods by areas and positions to encode alphabets representing the pronunciation of the Chinese character, distributing the alphabets into ten areas numbered from 0 to 9, arranging them in the positions numbered from 0 to 9 in each area, and taking the area code or the area and position codes of the alphabet as the code of the alphabet; then forming the code of the character by the alphabets or the codes of the alphabets forming the character; according to the pronunciations of the Chinese characters in different countries, encoding the Chinese character by the Chinese pronunciation of Chinese character, the Japanese pronunciation of Kanji character, and the Korean pronunciation of Hanja character.

① The digital operational encoding method of Chinese character of Chinese pronunciation The digital operational encoding method of Chinese character of Chinese pronunciation is as follows: according to the Chinese pronunciation of Chinese character, with 10 numerals from 0 to 9, using the operational encoding methods by areas and positions to encode the alphabets and the tone representing the Chinese pronunciation of Chinese character; distributing the alphabets into ten areas numbered from 0 to 9, arranging them to the positions numbered from 0 to 9 in each area, and taking the area code or the area and position code of the alphabet as the code of the alphabet; the tone is encoded by its ordinal number, the high-level tone (−) encoded to 1, the rising tone (/) encoded to 2, the third tone (v) encoded to 3, and the falling tone (\) to 4; then forming the code of the character by the alphabet and the tone or the codes of the alphabet and the tone, and performing the digital operational encoding of Chinese character by the PinYin alphabets, and the initial consonant and the final according to the type of alphabets forming the Chinese pronunciation of Chinese character.

A: The digital operational encoding method of Chinese character by PinYin alphabets The digital operational encoding method of Chinese character by PinYin alphabets is as follows: according to the Chinese pronunciation of Chinese character, with ten numerals from 0 to , using the operational encoding method of the PinYin alphabets by areas and positions to encode the PinYin alphabets and the tone representing the Chinese pronunciation of Chinese character, distributing the alphabets into ten areas numbered from 0 to 9, arranging them to the positions numbered from 0 to 9 in each area, and taking the area code or the area and position code of the alphabet as the code of the alphabet, and then forming the code of the character by the alphabets, the tone or the codes of the alphabets and the tone.

a. The method of operational encoding the Pinyin alphabets by areas and positions The method of operational encoding the PinYin alphabets by area and position includes: the operational encoding method of PinYin alphabets by areas (eight areas) and positions; and the operational encoding method of PinYin alphabets by areas (ten areas) and positions.

I: The operational encoding method of Pinyin alphabets by areas (eight areas) and positions The method of operational encoding the PinYin alphabets by areas (eight areas) and positions is as follows: using any eight of ten numerals from 0 to 9 to number eight or ten areas with one number for one area; dividing each area into three positions 1-3 or positions 1-4, and distributing 26 PinYin alphabets into 26 positions in the eight areas in alphabetic order; and taking the area code or the area and position code of the alphabet as the code of the alphabet; wherein:

The alphabets operationally encoded by positions for areas 2-9 are as follows respectively (as shown in FIG. 3):
Positions 1-4 of area 2 are correspondingly for: a, b, c, d
Positions 1-3 of area 3 are correspondingly for: e, f, g
Positions 1-4 of area 4 are correspondingly for: h, i, j, k
Positions 1-3 of area 5 are correspondingly for: l, m, n
Positions 1-3 of area 6 are correspondingly for: o, p, q
Positions 1-3 of area 7 are correspondingly for: r, s, t
Positions 1-3 of area 8 are correspondingly for: u, v, w
Positions 1-3 of area 9 are correspondingly for: x, y, z II: The operational encoding method of Pinyin alphabets by areas (ten areas) and positions The operational encoding method of PinYin alphabets by areas (ten areas) and positions is as follows: using ten numerals from 0 to 9 to number the divided ten areas with each numeral for one area; dividing each area into two positions 1-2 or three positions 1-3, and distributing the 26 PinYin alphabets into 26 positions in the ten areas in alphabetic order; and taking the area code or the area and position codes of the alphabet as the code of the alphabet; wherein:

The alphabets are operationally encoded by areas (0-9) and positions and are as follows respectively (as shown in FIG. 4):
Positions 1-2 of area 0 are correspondingly for: a, b
Positions 1-2 of area 1 are correspondingly for: c, d
Positions 1-3 of area 2 are correspondingly for: e, f, g
Positions 1-2 of area 3 are correspondingly for: h, i
Positions 1-2 of area 4 are correspondingly for: j, k
Positions 1-3 of area 5 are correspondingly for: l, m, n
Positions 1-3 of area 6 are correspondingly for: o, p, q
Positions 1-3 of area 7 are correspondingly for: r, s, t
Positions 1-3 of area 8 are correspondingly for: u, v, w
Positions 1-3 of area 9 are correspondingly for: x, y, z For example: in the operational encoding method of alphabet by areas (0-9) and positions, the Chinese pronunciation of "中" is "zhong", the area codes of its PinYin alphabets are: 9 for z, 3 for h, 6 for o, 5 for n, 2 for g, so "zhong" is encoded as 93652, and "zhong" is taken as the code of "中"; or the code 93652 of "zhong" is used to form the code of "中"; when the tone code is added, the high-level tone (−) is encoded as 1, so the code of "zhōng" is 936521, and zhōng is taken as the code of "中", or the code 936521 of "zhōng" is used to form the code of "中".

B: The digital operational encoding method of Chinese character by the initial consonant and final of Chinese syllable The digital operational encoding method of Chinese character by the initial consonant and final of Chinese syllable is as follows: according to the Chinese pronunciation of Chinese character, with 10 numerals from 0 to 9, using the operational encoding method of the initial consonant and the final by areas and positions to encode the initial consonant and the final and the tone representing the Chinese pronunciation of the Chinese character; distributing the alphabets into ten areas numbered from 0 to 9, arranging them to the positions numbered from 0 to 9 in each area, then the area code or the area and position code of the initial consonant and the final being taken as the code of the initial consonant and the final; the tone is encoded by its ordinal number, the high-level tone (−) encoded to 1, the rising tone (/) encoded to 2, the third tone (v) encoded to 3, the falling tone (\) encoded to 4; then forming the code of the character by the alphabets and the tone or the codes of the alphabets and the tones, and performing the encoding of Chinese characters and phrases according to the classification of single character and phrase of Chinese character.

a. The operational encoding method of initial consonant and final by areas and positions The operational encoding method of initial consonant and final by areas and positions includes: the operational encoding method of initial consonant and final by areas (9 areas) and positions, and the operational encoding method of initial consonant and final by areas (10 areas) and positions.

I: The operational encoding method of initial consonant and final by areas (9 areas) and positions The operational encoding method of initial consonant and final by areas (9 areas) and positions is: using any 9 of 10 numerals from 0 to 9 to number the divided 9 areas with one numeral for one area; dividing each area into four positions 1-4, and distributing no more than 40 initial consonants and finals into 40 positions in the ten areas in the order of the initial consonants and finals; and taking the area codes or the area and position codes of the initial consonants and finals as the code of the consonants and finals; wherein:

The Chinese initial consonants and finals of phonetic notation operationally encoded by positions for areas 1-9 are respectively as follows (as shown in FIG. 6):

Positions 1-4 of area 1 are correspondingly for: ㄅ, ㄆ, ㄚ, ㄎ

Positions 1-4 of area 2 are correspondingly for: ㄇ, ㄈ, ㄜ, ㄧ

Positions 1-4 of area 3 are correspondingly for: ㄉ, ㄊ, ㄨ, ㄩ

Positions 1-4 of area 4 are correspondingly for: ㄋ, ㄌ, ㄞ, ㄟ

Positions 1-4 of area 5 are correspondingly for: ㄍ, ㄋ, ㄠ, ㄡ

Positions 1-4 of area 6 are correspondingly for: ㄏ, ㄐ, ㄢ, ㄣ

Positions 1-4 of area 7 are correspondingly for: ㄥ, ㄒ, ㄓ, ㄤ

Positions 1-4 of area 8 are correspondingly for: 彳, ㄕ, ㄖ, ㄥ

Positions 1-4 of area 9 are correspondingly for: ㄗ, ㄘ, ㄙ, ㄝ

II: The operational encoding method of initial consonant and final positions for 10 areas The operational encoding method of initial consonant and final positions for 10 areas is as follows: using 10 numerals from 0 to 9 to number the divided 10 areas with each numeral for one area; dividing each area into four positions 1-4, and distributing no more than 40 initial consonants and finals into 40 positions in the ten areas in the order of the initial consonants and finals; then taking the area codes or the area and position codes of the initial consonants and finals as the codes thereof; wherein:

The initial consonants and finals of PinYin alphabets operationally encoded by areas (0-9) and positions are (as shown in FIG. 5):

Positions 1-4 of area 0 are correspondingly for: b, p, a, o
Positions 1-4 of area 1 are correspondingly for: m, f, e, I
Positions 1-4 of area 2 are correspondingly for: d, t, u, ü
Positions 1-4 of area 3 are correspondingly for: n, l, ai, ei
Positions 1-4 of area 4 are correspondingly for: g, k, ao, ou
Positions 1-4 of area 5 are correspondingly for: h, j, an, en
Positions 1-4 of area 6 are correspondingly for: q, x, ang, eng
Positions 1-4 of area 7 are correspondingly for: zh, ch, ong, ie
Positions 1-4 of area 8 are correspondingly for: sh, r, in, un
Positions 1-4 of area 9 are correspondingly for: z, c, s, ing c. According to the encoding of the above initial consonants, finals, and tones, the encoding methods of single character and phrase are described respectively as follows:

I: the encoding method of single character

According to the Chinese pronunciation of Chinese character, encode the initial consonant, final, and tone representing the Chinese pronunciation of Chinese character; take the area code or the area and position codes of the initial consonant and the final as the code of the initial consonant and the final, then form the code of the character by the initial consonant, final, and tone, or the codes thereof.

Example 1: the pinyin of "a" is "汉". In the operational encoding of the initial consonant and final by areas (10 areas) and positions 0-9, the area code of the initial consonant "h" is 6, and its area and position codes is 61, the area code of the final "an" is 6, and its area and position codes are 63, so "han" is encoded as 66 or 61(h), 63(an), then han is taken as the code of "汉"; when the tone code is added, the code of falling tone (\) is 4, so the code of "hàn" is 664 or 61(h), 63(an) and 4, and then hàn is taken as the code of "汉". Alternatively, the area and position codes 61 of the initial consonant "h", the area and position codes 63 of the final "an" and the code 4 of the falling tone (\) are combined to form the code of "汉", so the code of "汉" is 61634.

Example 2: the Chinese pronunciation of phonetic notation of "汉" is "ㄏㄢ". In the operational encoding of Chinese initial consonant and final of phonetic notation by areas 1-9 and positions, the area code of the initial consonant "ㄏ" is 6, the area code of the final "ㄢ" is 6, so the code of "ㄏㄢ" is 66, and ㄏㄢ are taken as the code of "汉"; when a tone code is added, the code of falling tone (\) is 4, so the code of "ㄏㄢ" is 664, then ㄏㄢ are taken as the code of "汉". Alternatively, the area and position codes 61 of the initial consonant "ㄏ", the area and position codes 63 of the final "ㄢ", and the code 4 of the falling tone (\) are combined to form the code of "汉", so the code of "汉" is 61634.

II: the encoding method of phrase

The encoding method of phrase is performed based on the number of characters contained in the phrase, i.e. two-character phrase, three-character phrase, and multi-character phrase of more than three character.

i. the encoding method of 2-character phrase

The encoding method of 2-character phrase is: taking the area codes of the initial consonant and the final of each Chinese character sequentially, thus forming the code of the 2-character phrase.

For example: the pinyin of phrase "信息" is "xin xi", the area code of the initial consonant "x" of "信" is 7, the area code of the final "in" is 9; the area code of the initial consonant "x" of "息" is 7, the area code of the final "i" is 2, so the code of phrase "信息" is 7972.

ii. The encoding method of 3-character phrase

The encoding method of 3-character phrase is as follows: taking sequentially the area codes of the initial consonants of the first two characters and the area codes of the initial consonant and final of the last character, thus forming the code of the 3-character phrase.

For example: the pinyin of phrase it "数字化" is "shu zi hua", the area code of the initial consonant sh of "数" is 8, the area code of the initial consonant z of "字" is 9, the area code of the initial consonant h of "化" is 5, the area codes of the finals u, and a are 2 and 0, so the code of phrase "数字化" is 89520.

iii. The encoding method of multi-character phrase

The encoding method of multi-character phrase is as follows: taking sequentially the area codes of the initial consonants of the first three characters, the area code of the initial consonants of the last character, thus forming the code of the multi-character phrase.

For example: in phrase "中华人民共和国", the pronunciation of "中" is "zhong", the area code of the initial consonant zh is 7; the pinyin of "华" is "hua", the area code of the initial consonant h is 5; the pinyin of "人" is "ren", the area code of the initial consonant r is 8; the pinyin of "国" is "guo", the area code of the initial consonant g is 4, so the code of phrase "中华人民共和国" is 7584.

C. The method of encoding sentence by Chinese pronunciation

The method of encoding sentence by Chinese pronunciation is as follows: taking the code of the initial alphabet in the pronunciation of each Chinese character forming the sentence, thus forming the code of the sentence.

For example: as to sentence "我说个笑话 给你听", the code of the first alphabet of "我" is 8, the code of the first alphabet of "说" is 7, the code of the first alphabet of "个" is 2, the code of the first alphabet of "笑" is 9, the code of the first alphabet of "话" is 3, the code of the first alphabet of "给" is 2, the code of the first alphabet of "你" is 5, the code of the first alphabet of "听" is 7, so the code of sentence "我说个笑话给你听" is 87293257.

It should be noted that the arrangement of the alphabets used here and the subsequent arrangements are only the preferred arrangement of the invention. Besides them, other types of arrangements are also practicable provided they can satisfy the requirement that one alphabet is uniquely determined by area code and position code.

② The digital operational encoding method of Kanji character by its Japanese pronunciation The digital operational encoding method of Kanji character by its Japanese pronunciation is as follows: according to the Japanese pronunciation of Kanji character, with 10 numerals from 0 to 9, using the operational encoding method of Japanese kana by areas and positions to encode the kana representing the Japanese pronunciation of the Kanji character; distributing the kana into ten areas numbered from 0 to 9, arranging them to the positions numbered from 0 to 9 in each area, and taking the area code or the area and position codes of the kana as the code of the kana, then using the kana or the code of the kana to form the code of the Kanji character; and based on the number of kana representing the Japanese pronunciation of the Kanji character, classify the Kanji character of Japanese pronunciation into the Kanji character with no more than three kana, and the Kanji character with more than three kana and encoding them separately.

A: a. The operational encoding method of Japanese kana by areas and positions

The operational encoding method of Japanese kana by areas and positions is as follows: using ten numerals from 0 to 9 to number the divided ten areas with one numeral for one area; dividing each area into five positions 1-5 or six positions 1-6, and distributing 80 Japanese kana into any 51 positions in the ten areas; and taking the area codes or the area and position codes of the kana as the code of the kana; wherein:

The Japanese kana operationally encoded by areas (0-9) and positions are as follows respectively (as shown in FIG. 7):

Positions 1-5 of area 0 are correspondingly for:
あ(ア), い(イ), う(ウ), え(エ), お(オ)

Positions 1-5 of area 1 are correspondingly for:
かが(カガ), きぎ(キギ) くぐ(クグ けげ(ケゲ こご(コゴ

Positions 1-5 of area 2 are correspondingly for:
さざ(サザ しじ(シジ すず(スズ せぜ(セゼ そぞ(ソゾ

Positions 1-5 of area 3 are correspondingly for:
ただ(タタ ちぢ(チヂ っづっ(ツヅツ てで(テデ とど(トド

Positions 1-5 of area 4 are correspondingly for:
な(ナ), に(ニ) ぬ(ヌ), ね(ネ), の(ノ

Positions 1-5 of area 5 are correspondingly for:
はばぱ(ハバパ ひびぴ(ヒビピ ふぶぷ(フブプ
へべぺ(ヘベペ ほぼぽ(ホボポ

Positions 1-5 of area 6 are correspondingly for:
ま(マ), み(ミ), む(ム め(メ), も(モ

Positions 1-5 of area 7 are correspondingly for:
やゃ (ヤヤ), い( ゆゅ(ユユ), え(エ よょ(ヨヨ

Positions 1-5 of area 8 are correspondingly for:
ら(ラ), り(リ る(ル), れ(レ), ろ(ロ

Positions 1-5 of area 9 are correspondingly for:
わ(ワ), ゐ(ヰ), う(ウ ゑ(ヱ), を(ヲ), ん(ン

B: Based on the above encoding of Japanese kana, the encoding methods of Kanji character are described respectively as follows by the number of kana representing the Japanese pronunciation of Kanji character with no more than three Japanese kana or more than three Japanese kana:

a. The encoding method of Kanji Character with no more than three Japanese kana representing its pronunciation Based on the Japanese pronunciation of Kanji character, encoding the kana representing the Japanese pronunciation of Kanji character, taking the area code or area and position codes of the kana as the code of the kana, and taking the kana or the code of the kana as the code of the Kanji character.

Example 1: as to the Kanji character with one Japanese kana representing the pronunciation, the Japanese pronunciation of "目" is "め", in the operational encoding of Japanese kana by areas (0-9) and positions, the area code of "め" is 6, and its area and position codes are 64, so the code of the kana "め" is 6 or 64, and the kana め is taken as the code of "目"; or the code 6 or 64 of the kana "め" is taken as the code of "目".

Example 2: as to the Kanji character with two Japanese kana representing the pronunciation, the kana of the Japanese pronunciation of "国" is "くに", in the operational encoding of Japanese kana by areas (0-9) and positions, the area code of "く" is 1, and its area and position codes are 13; the area code of "に" is 4, and its area and position codes are 42, so the code of the kana "くに" is 14 or 13(く), 42(に), and the code of "国" is formed by the kana くに; or the code of "国" is formed by the code 14 of the kana "くに".

Example 3: as to the Kanji character (or phrase) with three Japanese kana representing the pronunciation, the Japanese pronunciation of "我" is "わたし", in the operational encoding of Japanese kana by areas (10 areas) and positions 0-9, the area code of "わ" is 4, and its area and position codes are 44, the area code of "た" is 3, and its area and position codes are 31, the area code of "し" is 2, and its area and position codes are 22, so the code of the kana "わたし" is 432 or 44(わ), 31 (た) and 22(し), and the code of "我" is formed by the Kana わたし; or the code of "我" is formed by the code 432 of the kana "わたし".

b. The encoding method of Kanji character (or phrase) with more than three Japanese kana representing the pronunciation.

The encoding method of Kanji character (or phrase) with more than three Japanese kana representing the pronunciation is as follows: encoding the kana representing the Japanese pronunciation of Kanji character, taking the area code or area and position codes of the kana as the code of the kana, and taking each kana or the area code of the kana in sequence to form the code of the Kanji character (or phrase).

For example: The Japanese pronunciation of the phrase "手表" is "うでどけい", in the operational encoding of Japanese kana by areas (10 areas) and positions 0-9, the area code of "う" is 0, and its area and position codes are 03, the area code of "で" is 1, and its area and position codes are 15, the area code of "ど" is 3, and its area and position codes are 35, the area code of "け" is 1, the area and position codes are 14, the area code of "い" is 0, and its area and position codes are 02, so the code of "うでどけい" is 01310 or 03(う), 15(で), 35(ど), 14(け), 02(い), and the code of phrase "手表" is formed by the kana うでどけい; or the code of phrase "手表" is formed by the code 01310 of the kana うどけい..

③ The digital operational encoding method of Hanja character by its Korean pronunciation The digital operational encoding method of Hanja character by its Korean pronunciation is as follows: according to the Korean pronunciation of Hanja character, with 10 numerals from 0 to 9, using the operational encoding methods of alphabets by addition, subtraction, and areas and positions to encode the Korean alphabets representing the Korean pronunciation of the Hanja character; taking the code of the Korean alphabets, or the code of the Korean phonetic syllable representing the Korean pronunciation of Hanji character to form the code of the Hanja character; and according to the number of syllables representing the Korean pronunciation of the Hanja character, classifying the Hanja characters of Korean pronunciation respectively into the Hanja character with one, two, three, and more than three syllables representing their pronunciation and encoding them respectively.

A: the operational encoding methods of Korean alphabets by using addition, subtraction, areas and positions The operational encoding methods of Korean alphabets by using addition, subtraction, areas and positions are as follows: the method of operational encoding Korean alphabets by addition and subtraction; the method of operational encoding Korean alphabets by areas and positions.

a. The method of operational encoding Korean alphabets (24 basic alphabets) by addition and subtraction The method of encoding Korean alphabets (24 basic alphabets) by addition and subtraction is as follows: using ten numerals from 0 to 9 to classify the strokes of the Korean alphabets into five basic strokes, i.e., the horizontal, vertical, left-falling, dot, and hook, which are defined with codes of 1, 2, 3, 4, and 5 respectively; adding the stroke codes of the alphabets, and performing the operation of subtracting ten if the sum is equal to or over ten on the summation result to get the codes of the Korean alphabets defined respectively below:

0 for ㅇ、ㅊ, 1 for ㅡ and ㄹ, 2 for ㅣ and ㅎ, 3 for ㅏ、ㅓ、ㅗ、ㅜ, 4 for ㅑ、ㅕ, 5 for ㅛ、ㅠ、ㄱ、ㄴ, 6 for ㄷ、ㅐ, 7 for ㅅ、ㅌ, 8 for ㅁ、ㅂ, and 9 for ㅈ、ㅍ (as shown in FIG. 11).

b. The method of operational encoding Korean alphabets by areas and positions

The method of operational encoding Korean alphabets by areas and positions is as follows: distributing Korean alphabets to ten areas numbered from 0 to 9, and arranging them to the positions numbered from 0 to 9 in each area; taking the area code or the area and position codes of the Korean alphabet as the code of the Korean alphabet; according to the type of Korean alphabet, operational encoding the Korean alphabet by areas and positions respectively in an order of basic alphabets, or in an order of vowel and consonant alphabets; wherein:

I: The method of operational encoding the Korean Alphabet by areas and positions in an order of basic alphabets The method of operational encoding the Korean alphabet by areas and positions in an order of basic alphabets includes: the method of operational encoding of Korean alphabets by areas (eight areas) and positions, and the method of operational encoding of Korean alphabets by areas (ten areas) and positions.

i. The method of operational encoding of Korean alphabets by areas (eight areas) and positions The method of operational encoding of Korean alphabets by areas (eight areas) and positions is as follows: using any eight of ten numerals from 0 to 9 to number the divided eight areas with one numeral for one area; dividing each area into three positions 1-3; and distributing the 24 basic Korean alphabets into the 24 positions in the eight areas in alphabetic order; and taking the area codes or the area and position codes of the Korean alphabet as the code of the Korean alphabet; wherein:

The Korean alphabets operationally encoded by positions for areas 2-9 are as follows respectively (as shown in FIG. 8):

Positions 1-3 of area 2 are correspondingly for: ㄱ ㄴ ㄷ

Positions 1-3 of area 3 are correspondingly for: ㄹ ㅁ ㅂ

Positions 1-3 of area 4 are correspondingly for: ㅅ ㅇ ㅈ

Positions 1-3 of area 5 are correspondingly for: ㅊ ㅋ ㅌ

Positions 1-3 of area 6 are correspondingly for: ㅍ ㅎ ㅏ

Positions 1-3 of area 7 are correspondingly for: ㅑ ㅓ ㅕ

Positions 1-3 of area 8 are correspondingly for: ㅗ ㅛ ㅜ

Positions 1-3 of area 9 are correspondingly for: ㅠ ㅡ ㅣ ii. The method of operational encoding of Korean alphabets by areas (ten areas) and positions The method of operational encoding of Korean alphabets by areas (eight areas) and positions is as follows: using ten numerals from 0 to 9 to number the divided ten areas with one numeral for one area; dividing each area into two positions 1-2 or three positions 1-3; distributing the 24 basic Korean alphabets into the 24 positions in the ten areas in alphabetic order; and taking the area codes or the area and position codes of the Korean alphabet as the code of the Korean alphabet; wherein:

The Korean alphabets operationally encoded by areas (0-9) and positions are as follows respectively (as shown in FIG. 9):

Positions 1-3 of area 0 are correspondingly for: ㄱ ㄴ
Positions 1-3 of area 1 are correspondingly for: ㄹ ㄷ
Positions 1-3 of area 2 are correspondingly for: ㅁ ㅂ
Positions 1-3 of area 3 are correspondingly for: ㅅ ㅇ
Positions 1-3 of area 4 are correspondingly for: ㅈ ㅊ
Positions 1-3 of area 5 are correspondingly for: ㅋ ㅌ
Positions 1-3 of area 6 are correspondingly for: ㅍ ㅎ
Positions 1-3 of area 7 are correspondingly for: ㅏ ㅓ ㅑ
Positions 1-3 of area 8 are correspondingly for: ㅗ ㅛ ㅜ
Positions 1-3 of area 9 are correspondingly for: ㅠ ㅡ ㅣ

II: The method of operational encoding 40 Korean vowel, consonant alphabets by areas (ten areas) and positions in an order of the vowel, consonant alphabets The method of operational encoding 40 Korean vowel, consonant alphabets by areas (ten areas) and positions in an order of the vowel, consonant alphabets is as follows: using ten numerals from 0 to 9 to number the divided ten areas with one numeral for one area; dividing each area into four positions 1-4; distributing the 40 Korean vowel, consonant alphabets into the 40 positions in the ten areas; and taking the area codes or the area and position codes of the vowel, consonant alphabets as the code of the vowel, consonant alphabets.

The 40 Korean vowel, consonant alphabets operationally encoded by areas (ten areas) and positions are as follows respectively (as shown in FIG. 10):

Positions 1-4 of area 0 are correspondingly for: ㄱ ㄴ ㅏ ㅑ

Positions 1-4 of area 1 are correspondingly for: ㄷ ㄹ ㅓ ㅕ

Positions 1-4 of area 2 are correspondingly for: ㅁ ㅂ ㅗ ㅛ

Positions 1-4 of area 3 are correspondingly for: ㅅ ㅇ ㅜ ㅠ

Positions 1-4 of area 4 are correspondingly for: ㅈ ㅊ ㅡ ㅣ

Positions 1-4 of area 5 are correspondingly for: ㅌ ㅋ ㅐ ㅒ

Positions 1-4 of area 6 are correspondingly for: ㅍ ㅎ ㅔ ㅖ

Positions 1-4 of area 7 are correspondingly for: ㄲ ㄸ ㅝ ㅙ

Positions 1-4 of area 8 are correspondingly for: ㅃ ㅆ ㅘ ㅞ

Positions 1-4 of area 9 are correspondingly for: ㅉ ㅖ ㅟ ㅢ

B: Based on the code of the above 24 basic Korean alphabets, 40 vowel, consonant alphabets, the digital operational encoding method of the Korean pronunciation of Hanja character is classified into the followings according to the number of syllables representing the Korean pronunciation of Hanja character: encoding the Hanja character with one syllable, two syllables, three syllables, and more than three syllables representing its pronunciation respectively.

a. The method of encoding Hanja character with One Korean syllable representing its pronunciation The method of encoding Hanja character with one Korean syllable representing the pronunciation is as follows: based on the orders of writing of the alphabet, forming the code of the Hanja character by the area codes of the alphabets (including the basic alphabet, vowel, and consonant alphabets) representing the Korean phonetic syllables of the Hanja character, or by the Korean syllables.

For example: the Korean phonetic syllable of "女" is "녀". In the method of operational encoding 24 basic Korean alphabets by positions for areas 2-9, the area code of "ㄴ" is 3, and the area code of "ㅕ" is 7, so the code of "女" is 37 or 녀.

b. The method of encoding Hanja character (phrase) with two Korean syllables representing the pronunciation The method of encoding Hanja character (phrase) with two Korean syllables representing the pronunciation is as follows: based on the orders of writing of the alphabet, forming the code of the Hanja character (phrase) by the codes of the initial alphabet (including the basic alphabet, vowel, and consonant alphabets) and the end alphabet (including the basic alphabet, vowel, and consonant alphabets) of each syllable representing each Korean phonetic syllables, or by the Korean syllables.

For example: the Korean phonetic syllables of "经济" are "정제"; in the method of operational encoding 24 basic Korean alphabets by addition and subtraction, the initial alphabet of "정" is "ㅈ" with a code of 5, the end alphabet is "ㅇ" with a code of 0; the initial alphabet of "제" is "ㅈ" with a code of 9, the end alphabet is "ㅣ" with a code of 2, so the code of "经济" is 5092, or 정、제.

c. The method of encoding Hanja character (phrase) with three Korean syllables representing the pronunciation The method of encoding Hanja character (phrase) with three Korean syllables representing the pronunciation is as follows: based on the orders of writing of the alphabet, forming the code of the Hanja character (phrase) by the codes of the initial alphabets (including the basic alphabet, vowel, and consonant alphabets) of the first two syllables, the initial alphabet (including the basic alphabet, vowel, and consonant alphabets) and the end alphabet (including the basic alphabet, vowel, and consonant alphabets) of the last syllable, or by the Korean syllables.

For example: the Korean phonetic syllables of "信用证" are "신용정"; in the method of operational encoding 24 basic Korean alphabets by positions for areas 2-9, the initial alphabet of "신" is "ㅅ" with a area code of 2; the initial alphabet of "용" is "ㅇ" with a area code of 4; the initial alphabet of "정" is "ㅈ" with a area code of 4, the end alphabet is "ㅇ" with a area code of 4, so the code of "信用证" is 2444 or 신、용、정.

d. The method of encoding Hanja character (phrase) with more than three Korean syllables representing the pronunciation The method of encoding Hanja character (phrase) with more than three Korean syllables representing the pronunciation is as follows: based on the orders of writing of the alphabet, forming the code of the Hanja character (phrase) by the area code of the initial alphabet (including the basic alphabet, vowel, and consonant alphabets) of each syllable, or by the Korean syllables.

For example: the Korean phonetic syllables of "销售确认书" are "짠애확인서"; in the method of operational encoding 40 Korean vowel, consonant alphabets by areas (10 areas) and positions, the initial alphabet of "짠" is "ㅍ" with a area code of 6; the initial alphabet of "애" is "ㅇ" with a area code of 2; the initial alphabet of "확" is "ㅎ" with a area code of 6; the initial alphabet of "인" is "ㅇ" with a area code of 3; the initial alphabet of "서" is "ㅅ" with a area code of 3, so the code of "销售确认书" is 62633 or 판、해、확、신、서.

(3) The method of encoding Chinese character by the combination of its glyph and pronunciation The method of encoding Chinese character by the combination of its glyph and pronunciation is: according to the pronunciation and the glyph of the Chinese character, and on the basis of (1) the method of digital operational encoding of the Chinese character according to the glyph of the Chinese character, encoding the initial code of the radicals of the Chinese character and the end code of the remaining thereof; on the basis of (2) the method of digital operational encoding of the Chinese character according to the pronunciation of the Chinese character, encoding the initial consonant and final of the Chinese pronunciation of the Chinese character; forming the code of the Chinese character consecutively by the area codes of the initial consonant and final representing its Chinese pronunciation, the initial code of its radical and the end code of its remaining; and the encoding is carried out with respect to single character and phrase.

① the encoding method of single character

The encoding method of single character is as follows: the code of the Chinese character is formed by the area codes of the initial consonant and final representing its Chinese pronunciation, the initial code of its radical and the end code of its remaining.

For example: the Chinese pronunciation of "运" is "yun"; in the operational encoding of Chinese initial consonant and final of PinYin alphabets by areas (0-9) and positions, the area code of the initial consonant "y" is 1, the area code of the final "un" is 8; the code of the radical of "运" is 8, and the end code of the remaining "云" is 8, so the code of "运" is 1888.

② The encoding method of phrase

The encoding method of phrase is: a code of a Chinese character is formed by the area codes of the initial consonant and final representing its Chinese pronunciation; The encoding is performed with respect to 2-character phrase, 3-character phrase, and multi-character phrase.

A: the encoding method of 2-character phrase

The encoding method of 2-character phrase is as follows: taking the area codes of the initial consonant and the final of each Chinese character, thus sequentially forming the code of the 2-character phrase.

For example: the pronunciation of PinYin of phrase "信息" is "xin xi", the initial consonant of "信" is "x", and its area code is 6, the final thereof is "in", and its area code is 8; the initial consonant of "息" is "x", and its area code is 6, the final thereof is "i", and its area code is 1, so the code of phrase "信息" is 6861.

B: the encoding method of 3-character phrase

The encoding method of 3-character phrase is as follows: taking the area codes of the initial consonants of the first two characters and the area codes of the initial consonant and final of the last character, thus sequentially forming the code of the 3-character phrase.

For example: the pinyin of phrase "数字化" is "shu zi hua", the area code of the initial consonant sh of "数" is 8, the area code of the initial consonant z of "字" is 9, the area code of the initial consonant h of "化" is 5, the area code of the last final a is 0, so the code of phrase "数字化" is 8950.

C: The encoding method of multi-character phrase

The encoding method of multi-character phrase is as follows: taking the area codes of the initial consonants of the first three characters, the area code of the initial consonant of the last character, thus sequentially forming the code of the multi-character phrase.

For example: in phrase "中华人民共和国", the pronunciation of "中" is "zhong", the area code of the initial consonant zh is 7; the pronunciation of "华" is "hua", the area code of the initial consonant h is 5; the pinyin of "人" is "ren", the area code of its initial consonant r is 8; the pinyin of "国" is "guo", the area code of its initial consonant g is 4, so the code of phrase "中华人民共和国" is 7584.

Block Phonetic Character—The Encoding and Input Method of Korean Character

The block phonetic character—the Korean character is formed by alphabets arranged at top, bottom, left, and right sides in a block. Its digital operational encoding method is: encoding the syllables representing the Korean character, thus forming the code of the Korean character by the codes of syllables.

(1) The encoding method of Korean syllables

The Korean syllables generally consists of the Korean alphabets (including the basic alphabets, vowel, and consonant alphabets), and its digital operational encoding method is as follows: encoding the strokes and alphabets forming the glyph of the Korean syllable, and forming the code of the Korean syllable by the codes of the alphabets; according to the number of syllables representing the Korean character, classifying the Korean characters into the Korean characters with one, two, three, and more than three syllables and encoding them separately.

① The method of encoding the strokes and alphabets forming the glyph of the Korean character According to the glyphs and pronunciations of the Korean alphabets, with ten numerals from 0 to 9, use the addition and subtraction, using the operational encoding method by areas and positions to encode the strokes and alphabets forming the glyph of the Korean character.

A. The method of operational encoding alphabets (24 basic Korean alphabets) according to the glyphs of the Korean alphabets The method of operational encoding 24 basic Korean alphabets according to the glyphs of the Korean alphabets is as follows: according to the glyph of the Korean alphabet, classifying the strokes forming the Korean alphabets into five basic strokes, i.e., the horizontal, vertical, left-falling, dot, and hook, which are defined with codes of 1, 2, 3, 4, and 5 respectively; using ten numerals from 0 to 9, adding the codes of the strokes forming the alphabets, and performing the operation of subtracting ten if the sum is equal to or over ten to get the codes of the Korean alphabets defined respectively below: 0 for ㅇ、ㅊ, 1 for – and ㄹ, 2 for l and ㅎ, 3 for ㅏ、ㅓㅗ、ㅜ, 4 for ㅑ、ㅕ 5 for ㅛ、ㅠ、ㄱ、ㄴ, 6 for ㄷ、ㅂ, 7 for ㅅ、ㅌ, 8 for ㅁ、ㅐ and 9 for ㅈ、ㅍ (as shown in FIG. 1).

B. The method of operational encoding Korean alphabets by areas and positions

The Korean alphabets comprise the basic alphabets and the vowel and consonant alphabets formed by the basic alphabets. As to the basic alphabets, they can be encoded by the operational encoding method by areas (eight areas) and positions; as to the vowel and consonant alphabets, they can be encoded by the operational encoding method by areas (ten areas) and positions.

a. The method of operational encoding the basic Korean alphabets

There are 24 basic Korean alphabets, and the encoding method thereof is: using any eight of ten numerals from 0 to 9, and using the operational encoding method by areas (eight areas) and positions with one numeral for one area; dividing each area into three positions 1-3; and distributing the 24 basic Korean alphabets into the 24 positions in the eight areas in alphabetic order; and taking the area codes or the area and position codes of the Korean alphabet as the code of the Korean alphabet; wherein:

The Korean alphabets operationally encoded by positions for areas 2-9 are as follows respectively (as shown in FIG. 8):

Positions 1-3 of area 2 are correspondingly for: ㄱ ㄴ ㄷ

Positions 1-3 of area 3 are correspondingly for: ㄹ ㅁ ㅂ
Positions 1-3 of area 4 are correspondingly for: ㅅ ㅇ ㅈ
Positions 1-3 of area 5 are correspondingly for: ㅊ ㅋ ㅌ
Positions 1-3 of area 6 are correspondingly for: ㅍ ㅎ ㅏ
Positions 1-3 of area 7 are correspondingly for: ㅑ ㅓ ㅕ
Positions 1-3 of area 8 are correspondingly for: ㅗ ㅛ ㅜ

Positions 1-3 of area 9 are correspondingly for: ㅠ ㅡ ㅣ b. The method of operational encoding Korean vowel, consonant alphabets

There are totally 40 Korean vowel, consonant alphabets, and the encoding method thereof is: using ten numerals from 0 to 9, and using the operational encoding method by areas (10 areas) and positions with one numeral for one area; dividing each area into four positions 1-4; distributing the 40 Korean vowel, consonant alphabets into the 40 positions in the ten areas; and taking the area codes or the area and position codes of the alphabets as the code of the alphabets; wherein:

The vowel, consonant alphabets operationally encoded by areas (0-9) and positions are as follows respectively (as shown in FIG. 10):

Positions 1-4 of area 0 are correspondingly for: ㄱ ㄴ
Positions 1-4 of area 1 are correspondingly for: ㄹ ㄷ
Positions 1-4 of area 2 are correspondingly for: ㅁ ㅂ
Positions 1-4 of area 3 are correspondingly for: ㅅ ㅇ
Positions 1-4 of area 4 are correspondingly for: ㅈ ㅊ
Positions 1-4 of area 5 are correspondingly for: ㅋ ㅌ
Positions 1-4 of area 6 are correspondingly for: ㅍ ㅎ ㅏ
Positions 1-4 of area 7 are correspondingly for: ㅑ ㅓ ㅕ
Positions 1-4 of area 8 are correspondingly for: ㅗ ㅛ ㅜ

Positions 1-4 of area 9 are correspondingly for: ㅠ ㅡ ㅣ

②Based on the code of the above alphabets, the encoding methods of Korean characters represented by one syllable, two syllables, three syllables, and more than three syllables are respectively as follows:

A. The method of encoding Korean character represented by one syllable

The method of encoding Korean character represented by one syllable is: based on the orders of writing of the alphabet, forming the code of the Korean character by the area codes of the Korean alphabets.

For example: in the method of operational encoding 24 basic alphabets by positions for areas 2-9, for "녀 (女)", the area code of "ㄴ" is 3, the area code of "ㅕ" is 7, so the code of "녀" is 37.

B. The method of encoding Korean character (phrase) represented by two syllables The method of encoding Korean character (phrase) represented by two syllables is as follows: based on the orders of writing of the alphabet, forming the code of the Korean character (phrase) by the codes of the initial and the end alphabets of each syllable or by its syllables in sequence.

For example: in the method of operational encoding 24 basic Korean alphabets by addition and subtraction, for "정제 (经济)", the initial alphabet of "정" is "ㅈ" with a code of 5, the end alphabet is "ㅇ" with a code of 0; the initial alphabet of "제" is "ㅈ" with a code of 9, the end alphabet is "ㅣ" with a code of 2, so the code of "정제 (经济)" is 5092, or 정、제.

C. The method of encoding Korean character (phrase) represented by three syllables The method of encoding Korean character (phrase) represented by three syllables is as follows: based on the orders of writing of the alphabet, forming the code of the Korean character (phrase) by the codes of the initial alphabets of the first two syllables, the initial and the end alphabets of the last syllable, or by the syllables.

For example: in the method of operational encoding 24 basic Korean alphabets by positions for areas 2-9, for "신용정 (信用证)", the initial alphabet of "신" is "ㅅ" with a area code of 2; the initial alphabet of "용" is "ㅇ" with a area code of 4; the initial alphabet of "정" is "ㅈ" with a area code of 4, the end alphabet is "ㅇ" with a area code of 4, so the code of "신용정 (信用证)" is 2444 or 신、용、정.

D. The method of encoding Korean character (phrase) represented by more than three syllables The method of encoding Korean character (phrase) represented by more than three syllables is: based on the orders of writing of the alphabet, forming the code of the Korean character (phrase) by the area code of the initial alphabet of each syllable, or by the syllables.

For example: in the method of operational encoding Korean alphabets by addition and subtraction, for "판해확인서 (销售确认书)", the initial alphabet of "판" is "ㅍ" with a code of 9, the initial alphabet of "해" is "ㅇ" with a code of 8, the initial alphabet of "확" is "ㅎ" with a code of 2, the initial alphabet of "인" is "ㅇ" with a code of 0, the initial alphabet of "서" is "ㅅ" with a code of 5, so the code of "판해확인서 (销售确认书)" is 98205 or 판、해、확、인、서.

1.1.2. Digital operational encoding method of the linear character

The linear character is generally formed by alphabets arranged from left to right or from right to left in a line. Its smallest meaningful unit is word. Its digital operational encoding method is: encoding the alphabets forming the word of linear character, and forming the code of the word of linear character by the codes of alphabets.

(1) The encoding method of the word of linear character

The word of linear character is generally formed by the alphabets of the linear character arranged from left to right or from right to left in a line, and its digital operational encoding method is as follows: encoding the alphabets forming the word of linear character; forming the code of the word of linear character by the codes of the alphabets; and including the full spelling encoding method of word and simplified spelling encoding of word.

(1) The encoding method of alphabets of linear character

The alphabets of linear characters are different in different countries. For each of these countries using linear characters, only several tens of characters are present. The digital operational encoding method of linear character is as follows: using ten numerals from 0 to 9, and using the operational encoding method by areas and positions to distribute the alphabets into ten areas numbered with 0-9, and arrange them to the positions numbered with 0-9 in each area; forming the code of the alphabet by the area code or the area and position codes of the alphabet.

According to the difference of the linear characters in different countries, perform the digital operational encoding of the alphabets of linear characters by countries; wherein:

A: The digital operational encoding method of English alphabets

The method of operational encoding English alphabets by areas and positions includes: the method of operational encoding English alphabets by areas (eight areas) and positions, and the method of operational encoding English alphabets by areas (ten areas) and positions.

I: The method of operational encoding English alphabets by areas (eight areas) and positions The method of operational encoding English alphabets by areas (eight areas) and positions is as follows: using any eight of ten numerals from 0 to 9 to number the divided eight areas with one numeral for one area; dividing each area into three positions 1-3 or four positions 1-4; distributing the 26 English alphabets into the 26 positions in the eight areas; and taking the area code or the area and position codes of the alphabet as the code of the alphabet; wherein:

The English alphabets operationally encoded by positions for areas 2-9 are as follows respectively (as shown in FIG. 12):

Positions 1-4 of area 2 are correspondingly for: Aa, Bb, Cc, Dd
Positions 1-3 of area 3 are correspondingly for: Ee, Ff, Gg
Positions 1-4 of area 4 are correspondingly for: Hh, Ii, Jj, Kk
Positions 1-3 of area 5 are correspondingly for: Ll, Mm, Nn
Positions 1-3 of area 6 are correspondingly for: Oo, Pp, Qq
Positions 1-3 of area 7 are correspondingly for: Rr, Ss, Tt
Positions 1-3 of area 8 are correspondingly for: Uu, Vv, Ww
Positions 1-3 of area 9 are correspondingly for: Xx, Yy, Zz II: The method of operational encoding English alphabets by areas (ten areas) and positions The method of operational encoding English alphabets by areas (ten areas) and positions is as follows: using ten numerals from 0 to 9 to number the divided ten areas with one numeral for one area; dividing each area into two positions 1-2 or three positions 1-3; distributing the 26 English alphabets into the 26 positions in the ten areas; and taking the area code or the area and position codes of the alphabet as the code of the alphabet; wherein:

The English alphabets operationally encoded by areas (0-9) and positions are as follows respectively (as shown in FIG. 13):

Positions 1-2 of area 0 are correspondingly for: Aa, Bb
Positions 1-2 of area 1 are correspondingly for: Cc, Dd
Positions 1-3 of area 2 are correspondingly for: Ee, Ff, Gg
Positions 1-2 of area 3 are correspondingly for: Hh, Ii
Positions 1-2 of area 4 are correspondingly for: Jj, Kk
Positions 1-3 of area 5 are correspondingly for: Ll, Mm, Nn
Positions 1-3 of area 6 are correspondingly for: Oo, Pp, Qq
Positions 1-3 of area 7 are correspondingly for: Rr, Ss, Tt
Positions 1-3 of area 8 are correspondingly for: Uu, Vv, Ww
Positions 1-3 of area 9 are correspondingly for: Xx, Yy, Zz B: The digital operational encoding method of Spanish alphabets The method of operational encoding Spanish alphabets by areas and positions includes: the method of operational encoding Spanish alphabets by areas (eight areas) and positions, and the method of operational encoding Spanish alphabets by areas (ten areas) and positions.

I: The method of operational encoding Spanish alphabets by areas (eight areas) and positions The method of operational encoding Spanish alphabets by areas (eight areas) and positions is as follows: using any eight of ten numerals from 0 to 9 to number the divided eight areas with one numeral for one area; dividing each area into three positions 1-3 or four positions 1-4; distributing the 34 Spanish alphabets into the 29 positions in the eight areas; and taking the area code or the area and position codes of the alphabet as the code of the alphabet; wherein:

The Spanish alphabets operationally encoded by positions for areas 2-9 are as follows respectively (as shown in FIG. 14):

Positions 1-4 of area 2 are correspondingly for:
Aa(á), Bb, C(Ch)c(ch), Dd
Positions 1-3 of area 3 are correspondingly for:
Ee(é), Ff, Gg
Positions 1-4 of area 4 are correspondingly for:
Hh, Ii(í), Jj, Kk
Positions 1-3 of area 5 are correspondingly for:
L(Ll)l(ll), Mm, N(Ñ)n(ñ)
Positions 1-3 of area 6 are correspondingly for:
Oo(ó), Pp, Qq
Positions 1-3 of area 7 are correspondingly for:
Rr, Ss, Tt
Positions 1-3 of area 8 are correspondingly for:
Uu(ú), Vv, Ww
Positions 1-3 of area 9 are correspondingly for:
Xx, Yy, Zz$_o$ II: The method of operational encoding Spanish alphabets by areas (ten areas) and positions The method of operational encoding Spanish alphabets by areas (ten areas) and positions is as follows: using ten numerals from 0 to 9 to number the divided ten areas with one numeral for one area; dividing each area into two positions 1-2, three positions 1-3, or four positions 1-4; distributing the 34 Spanish alphabets into the 29 positions in the ten areas; and taking the area code or the area and position codes of the alphabet as the code of the alphabet; wherein:

The Spanish alphabets operationally encoded by areas (0-9) and positions are as follows respectively (as shown in FIG. 15):

Positions 1-2 of area 0 are correspondingly for: Aa(á), Bb
Positions 1-2 of area 1 are correspondingly for: C(Ch)c(ch), Dd
Positions 1-3 of area 2 are correspondingly for: Ee(é), Ff, Gg
Positions 1-2 of area 3 are correspondingly for: Hh, Ii(í)
Positions 1-2 of area 4 are correspondingly for: Jj, Kk
Positions 1-3 of area 5 are correspondingly for: L(Ll)l(ll), Mm, N(Ñ)n(ñ)
Positions 1-2 of area 6 are correspondingly for: Oo(ó), Pp, Qq
Positions 1-3 of area 7 are correspondingly for: Rr, Ss, Tt
Positions 1-3 of area 8 are correspondingly for: Uu(ú), Vv, Ww
Positions 1-3 of area 9 are correspondingly for: Xx, Yy, Zz C: The digital operational encoding method of German alphabets The method of operational encoding German alphabets by areas and positions includes: the method of operational encoding German alphabets by areas (eight areas) and positions, and the method of operational encoding German alphabets by areas (ten areas) and positions.

Figure 16:
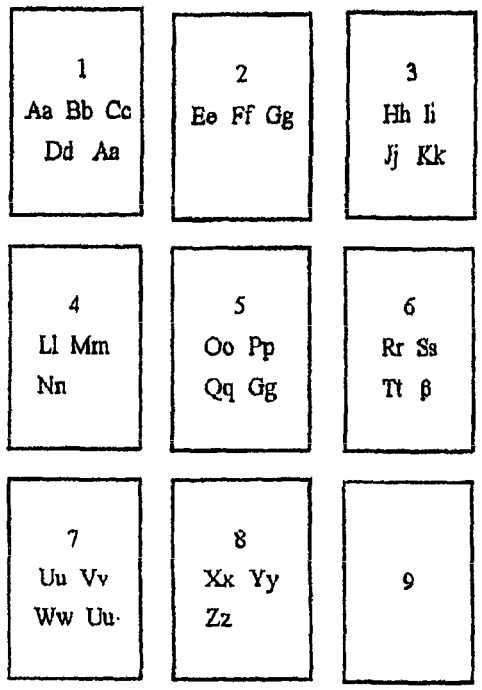
FIG. 16 shows the distribution of German alphabets in areas 1-8.

I: The method of operational encoding German alphabets by areas (eight areas) and positions The method of operational encoding German alphabets by areas (eight areas) and positions is as follows: using any eight of ten numerals from 0 to 9 to number the divided eight areas with one numeral for one area; dividing each area into three positions 1-3 or four positions 1-4; distributing the 34 German alphabets into the 29 positions in the eight areas; and taking the area code or the area and position codes of the alphabet as the code of the alphabet; wherein:

The German alphabets operationally encoded by positions for areas 2-9 are as follows respectively (as shown in FIG. 16):

Positions 1-4 of area 2 are correspondingly for: A(A)a(a), Bb, Cc, Dd

Positions 1-3 of area 3 are correspondingly for: Ee, Ff, Gg

Positions 1-4 of area 4 are correspondingly for: Hh, Ii, Jj, Kk

Positions 1-3 of area 5 are correspondingly for: Ll, Mm, Nn

Positions 1-3 of area 6 are correspondingly for: O(O)o(o), Pp, Qq

Positions 1-4 of area 7 are correspondingly for: Rr, Ss, Tt, β

Positions 1-3 of area 8 are correspondingly for: U(ü)u(ü), Vv, Ww

Positions 1-3 of area 9 are correspondingly for: Xx, Yy, Zz

Figure 17:
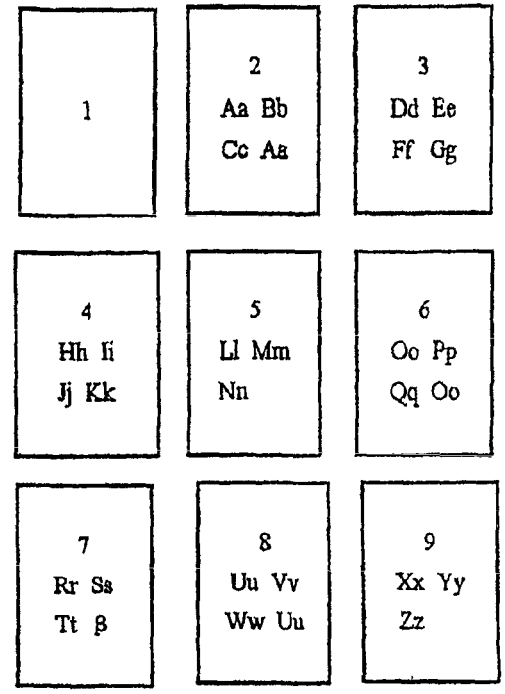
FIG. 17 shows the distribution of German alphabets in areas 0-9.

II: The method of operational encoding German alphabets by areas (ten areas) and positions The method of operational encoding German alphabets by areas (ten areas) and positions is as follows: using ten numerals from 0 to 9 to number the divided ten areas with one numeral for one area; dividing each area into two positions 1-2 or three positions 1-3; distributing the 34 German alphabets into the 29 positions in the ten areas; and taking the area code or the area and position codes of the alphabet as the code of the alphabet; wherein:

The German alphabets operationally encoded by areas (0-9) and positions are as follows respectively (as shown in FIG. 17):

Positions 1-2 of area 0 are correspondingly for: A(A)a(a), Bb

Positions 1-2 of area 1 are correspondingly for: Cc, Dd

Positions 1-3 of area 2 are correspondingly for: Ee, Ff, Gg

Positions 1-2 of area 3 are correspondingly for: Hh, Ii

Positions 1-2 of area 4 are correspondingly for: Jj, Kk

Positions 1-3 of area 5 are correspondingly for: Ll, Mm, Nn

Positions 1-3 of area 6 are correspondingly for: O(O)o(o), Pp, Qq

Positions 1-4 of area 7 are correspondingly for: Rr, Ss, Tt, β

Positions 1-3 of area 8 are correspondingly for: U(ü)u(ü), Vv, Ww

Positions 1-3 of area 9 are correspondingly for: Xx, Yy, Zz

D: The encoding method of Russian alphabets

The method of operational encoding Russian alphabets by areas and positions includes: the method of operational encoding Russian alphabets by areas (eight areas) and positions, and the method of operational encoding Russian alphabets by areas (ten areas) and positions.

Figure 18:
FIG. 18 shows the distribution of Russian alphabets in areas 1-8.

I: The method of operational encoding Russian alphabets by areas (eight areas) and positions The method of operational encoding Russian alphabets by areas (eight areas) and positions is as follows: using any eight of ten numerals from 0 to 9 to number the divided eight areas with one numeral for one area; dividing each area into three positions 1-3 or four positions 1-4; distributing the 32 Russian alphabets into the 32 positions in the eight areas; and taking the area code or the area and position codes of the alphabet as the code of the alphabet; wherein:

The Russian alphabets operationally encoded by positions for areas 2-9 are as follows respectively (as shown in FIG. 18):

Positions 1-4 of area 2 are correspondingly for: Аа, Бб, Вв, Гг

Positions 1-4 of area 3 are correspondingly for: Дд, Ее, Жж, Зз

Positions 1-4 of area 4 are correspondingly for: Ии, Йй, Кк, Лл

Positions 1-4 of area 5 are correspondingly for: Мм, Нн, Оо, Пп

Positions 1-4 of area 6 are correspondingly for: Рр, Сс, Тт, Уу

Positions 1-4 of area 7 are correspondingly for: Фф, Хх, Цц, Чч

Positions 1-4 of area 8 are correspondingly for: Шш, Щщ, Ъъ, Ыы

Positions 1-4 of area 9 are correspondingly for: Ьь, Ээ, Юю, Яя

Figure 19:
FIG. 19 shows the distribution of Russian alphabets in areas 0-9.

II: The method of operational encoding Russian alphabets by areas (ten areas) and positions The method of operational encoding Russian alphabets by areas (ten areas) and positions is as follows: using ten numerals from 0 to 9 to number the divided ten areas with one numeral for one area; dividing each area into two positions 1-2 or three positions 1-3; distributing the 34 Russian alphabets into the 34 positions in the ten areas; and taking the area code or the area and position codes of the alphabet as the code of the alphabet; wherein:

The Russian alphabets operationally encoded by areas (0-9) and positions are as follows respectively (as shown in FIG. 19):

Positions 1-3 of area 0 are correspondingly for: Аа, Бб, Вв

Positions 1-3 of area 1 are correspondingly for: Гг, Дд, Ее

Positions 1-3 of area 2 are correspondingly for: Жж, Зз, Ии

Positions 1-3 of area 3 are correspondingly for: Йй, Кк, Лл

Positions 1-4 of area 4 are correspondingly for: Мм, Нн, Оо, П

Positions 1-3 of area 5 are correspondingly for: Рр, Сс, Тт

Positions 1-3 of area 6 are correspondingly for: Уу, Фф, Хх

Positions 1-3 of area 7 are correspondingly for: Цц, Чч, Шш

Positions 1-3 of area 8 are correspondingly for: Щщ, Ъъ, Ыы

Positions 1-4 of area 9 are correspondingly for: Ьь, Ээ, Юю, Яя

E: The encoding method of French alphabets

The method of operational encoding French alphabets by areas and positions includes: the method of operational encoding French alphabets by areas (eight areas) and positions, and the method of operational encoding French alphabets by areas (ten areas) and positions.

Figure 20:
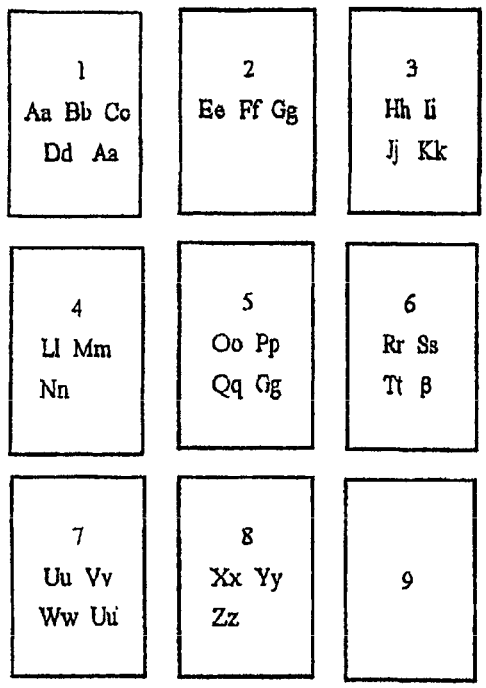
FIG. 20 shows the distribution of French alphabets in areas 1-8.

I: The method of operational encoding French alphabets by areas (eight areas) and positions The method of operational encoding French alphabets by areas (eight areas) and positions is as follows: using any eight of ten numerals from 0 to 9 to number the divided eight areas with one numeral for one area; dividing each area into three positions 1-3 or four positions 1-4; distributing the 26 French alphabets into the 26 positions in the eight areas; and taking the area code or the area and position codes of the alphabet as the code of the alphabet; wherein:

a. The French alphabets operationally encoded by positions for areas 2-9 are as follows respectively (as shown in FIG. 20):

Positions 1-4 of area 2 are correspondingly for: Aa(à), Bb, Cc, Dd

Positions 1-3 of area 3 are correspondingly for: Ee(èéê), Ff, Gg

Positions 1-4 of area 4 are correspondingly for: Hh, Ii, Jj, Kk

Positions 1-3 of area 5 are correspondingly for: Ll, Mm, Nn

Positions 1-3 of area 6 are correspondingly for: Oo, Pp, Qq

Positions 1-3 of area 7 are correspondingly for: Rr, Ss, Tt

Positions 1-3 of area 8 are correspondingly for: Uu(u), Vv, Ww

Positions 1-3 of area 9 are correspondingly for: Xx, Yy, Zz

Figure 21:
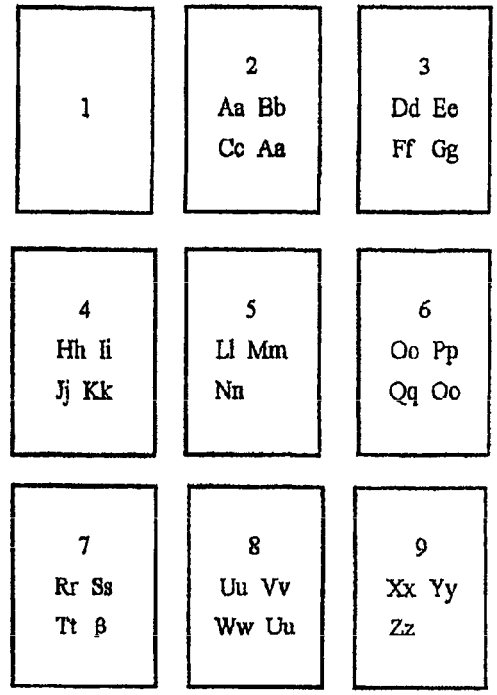
FIG. 21 shows the distribution of French alphabets in areas 0-9.

II: The method of operational encoding French alphabets by areas (ten areas) and positions The method of operational encoding French alphabets by areas (ten areas) and positions is as follows: using ten numerals from 0 to 9 to number the divided ten areas with one numeral for one area; dividing each area into two positions 1-2 or three positions 1-3; distributing the 26 French alphabets into the 26 positions in the ten areas; and taking the area code or the area and position codes of the alphabet as the code of the alphabet; wherein:

The French alphabets operationally encoded by areas (0-9) and positions are as follows respectively (as shown in FIG. 21):

Positions 1-3 of area 0 are correspondingly for: Aa(à), Bb

Positions 1-3 of area 1 are correspondingly for: Cc, Dd

Positions 1-3 of area 2 are correspondingly for: Ee(èéê), Ff, Gg

Positions 1-3 of area 3 are correspondingly for: Hh, Ii

Positions 1-3 of area 4 are correspondingly for: Jj, Kk

Positions 1-3 of area 5 are correspondingly for: Ll, Mm, Nn

Positions 1-4 of area 6 are correspondingly for: Oo, Pp, Qq

Positions 1-3 of area 7 are correspondingly for: Rr, Ss, Tt

Positions 1-4 of area 8 are correspondingly for: Uu(u), Vv, Ww

Positions 1-3 of area 9 are correspondingly for: Xx, Yy, Zz

F: The encoding method of Greek alphabets

The method of operational encoding Greek alphabets by areas and positions includes: the method of operational encoding Greek alphabets by areas (eight areas) and positions, and the method of operational encoding Greek alphabets by areas (ten areas) and positions.

Figure 22:
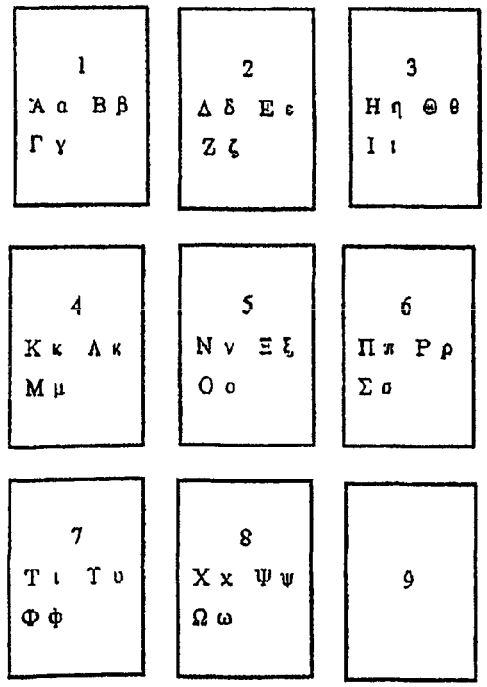
FIG. 22 shows the distribution of Greek alphabets in areas 1-8.

I: The method of operational encoding Greek alphabets by areas (eight areas) and positions The method of operational encoding Greek alphabets by areas (eight areas) and positions is as follows: using any eight of ten numerals from 0 to 9 to number the divided eight areas with one numeral for one area; dividing each area into three positions 1-3; distributing the 24 Greek alphabets into the 24 positions in the eight areas; and taking the area code or the area and position codes of the alphabet as the code of the alphabet; wherein:

The Greek alphabets operationally encoded by positions for areas 2-9 are as follows respectively (as shown in FIG. 22):

Positions 1-3 of area 2 are correspondingly for: A α, B β, Γ γ

Positions 1-3 of area 3 are correspondingly for: Δ δ, E ε, Z ζ

Positions 1-3 of area 4 are correspondingly for: H η, Θ θ, I ι

Positions 1-3 of area 5 are correspondingly for: K κ, Λ λ, M μ

Positions 1-3 of area 6 are correspondingly for: N ν, Ξ ξ, O o

Positions 1-3 of area 7 are correspondingly for: Π π, P ρ, Σ σ

Positions 1-3 of area 8 are correspondingly for: T τ, Y υ, Φ φ

Positions 1-3 of area 9 are correspondingly for: X χ, Ψ ω, ΩË

Figure 23:
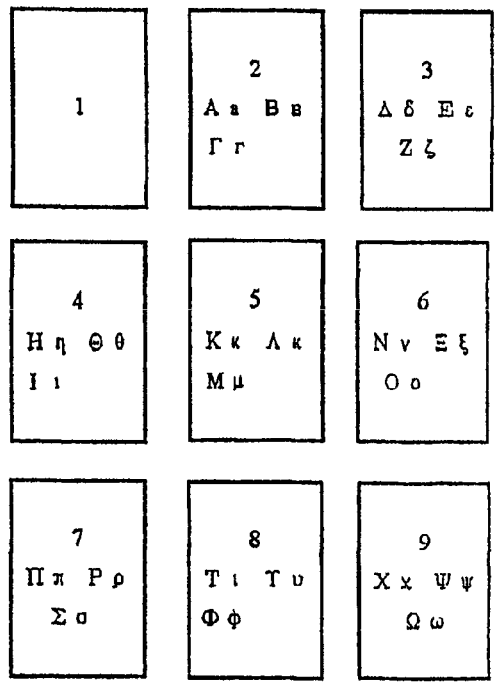
FIG. 23 shows the distribution of Greek alphabets in areas 0-9.

II: The method of operational encoding Greek alphabets by areas (ten areas) and positions The method of operational encoding Greek alphabets by areas (ten areas) and positions is as follows: using ten numerals from 0 to 9 to number the divided ten areas with one numeral for one area; dividing each area into two positions 1-2 or three positions 1-3; distributing the 24 Greek alphabets into the 24 positions in the ten areas; and taking the area code or the area and position codes of the alphabet as the code of the alphabet; wherein:

The Greek alphabets operationally encoded by areas (0-9) and positions are as follows respectively (as shown in FIG. 23):

Positions 1-2 of area 0 are correspondingly for: A α, B β

Positions 1-2 of area 1 are correspondingly for: Γ γ, Δ δ

Positions 1-2 of area 2 are correspondingly for: E ε, Z ζ

Positions 1-2 of area 3 are correspondingly for: H η, Θ 74

Positions 1-2 of area 4 are correspondingly for: I ι, K κ

Positions 1-2 of area 5 are correspondingly for: Λ λ, M μ

Positions 1-3 of area 6 are correspondingly for: N ν, Ξ ξ, O o

Positions 1-3 of area 7 are correspondingly for: Π π, P ρ, Σ σ

Positions 1-3 of area 8 are correspondingly for: T τ, Y υ, Φ φ

Positions 1-3 of area 9 are correspondingly for: X χ, Ψ ω, ΩË

G: The encoding method of Arabic alphabets

The method of operational encoding Arabic alphabets by areas and positions includes: the method of operational encoding Arabic alphabets by areas (eight areas) and positions, and the method of operational encoding Arabic alphabets by areas (ten areas) and positions.

I: The method of operational encoding Arabic alphabets by areas (eight areas) and positions The method of operational encoding Arabic alphabets by areas (eight areas) and positions is as follows: using any eight of ten numerals from 0 to 9 to number the divided eight areas with one numeral for one area; dividing each area into three positions 1-3 or four positions 1-4; distributing the 28 Arabic alphabets into the 28 positions in the eight areas; and taking the area code or the area and position codes of the alphabet as the code of the alphabet; wherein:

a. The Arabic alphabets operationally encoded by positions for areas 2-9 are as follows respectively (as shown in FIG. 24):

Positions 1-3 of area 2 are correspondingly for: ط ل ن

Positions 1-3 of area 3 are correspondingly for: م ف ب

Positions 1-4 of area 4 are correspondingly for: ز ص س

Positions 1-3 of area 5 are correspondingly for: د ذ ر

Positions 1-4 of area 6 are correspondingly for: و ث ت س

Positions 1-4 of area 7 are correspondingly for: ء أ لا ئ

Positions 1-4 of area 8 are correspondingly for: خ ح ج ش

Positions 1-4 of area 9 are correspondingly for: ع غ ظ ض

II: The method of operational encoding Arabic alphabets by areas (ten areas) and positions The method of operational encoding Arabic alphabets by areas (ten areas) and positions is as follows: using ten numerals from 0 to 9 to number the divided ten areas with one numeral for one area; dividing each area into three positions 1-3 or four positions 1-4; distributing the 28 Arabic alphabets into the 28 positions in the ten areas; and taking the area code or the area and position codes of the alphabet as the code of the alphabet; wherein:

The Arabic alphabets operationally encoded by areas (0-9) and positions are as follows respectively (as shown in FIG. 25):

Positions 1-4 of area 0 are correspondingly for: ن ل ط ب

Positions 1-4 of area 1 are correspondingly for: ف ص س م

Positions 1-4 of area 2 are correspondingly for: ز ر ذ د

Positions 1-2 of area 3 are correspondingly for: ث ت

Positions 1-2 of area 4 are correspondingly for: ي د

Positions 1-2 of area 5 are correspondingly for: لا أ

Positions 1-3 of area 6 are correspondingly for: ئ ء

Positions 1-3 of area 7 are correspondingly for: ح ج

Positions 1-2 of area 8 are correspondingly for: خ ح ج

Positions 1-2 of area 9 are correspondingly for: ش ع

(2) The encoding method of the words of linear character

The word of linear character is generally formed by the alphabets of the linear character arranged from left to right or from right to left in a line, and its digital operational encoding method is as follows: encoding the alphabets forming the word of linear character; forming the code of the word of linear character by the codes of its alphabets; and the encoding method is classified into full spelling encoding method of word and simplified spelling encoding method of word.

The full spelling encoding method of the word:

Taking the area codes of the alphabets forming the word sequentially to form the code of the word, or the code of the word is formed by the area and position codes of the alphabets sequentially.

EXAMPLE

In the operational encoding method of alphabets by positions for areas 2-9, for word "china", the area code of "c" is 2, and its area and position codes is 23; the area code of "h" is 4, and its area and position codes is 41; the area code of "i" is 4, and its area and position codes is 42; the area code of "n" is 5, and its area and position codes is 53; the area code of "a" is 2, and its area and position codes is 21; so the code of "china" is 24452, or 23(c), 41(h), 42(i), 53(n), 21(a).

The simplified spelling encoding method of word:

For words with more than 6 alphabets, taking the area codes of the first three alphabets and the end three alphabets forming the word sequentially to form the code of the word. For word with no more than 6 alphabets, taking the area codes of all alphabets forming the word to form the code of the word.

Example 1

In the operational encoding method of alphabets by areas (0-9) and positions, the codes of the first three alphabets I, n, and t of word "intellectual" are 3, 5, 7 respectively, and the codes of its end three alphabets u, a, and 1 are 8, 0, and 5 respectively, so the code of word "intellectual" is 357805.

Example 2

In the operational encoding method of alphabets by positions for areas 2-9, for word "china", the area code of "c" is 2; "h" is 4; "i" is 4; "n" is 5; "a" is 2; so the code of "china" is 24452.

1.1.3. The Hybrid Character—the Digital Operational Encoding and Input Method of Japanese Character The hybrid character is formed by combining the block character and the linear character, and Japanese is a typical one of such hybrid character. Japanese character is formed by combining the Kanji character of block character, the Japanese word of linear character, and the Japanese Roman words. Its digital operational encoding and input method is as follows: using ten numerals from 0 to 9, and using the operational encoding method by areas and positions to encode the Japanese kana forming the Japanese word and the pronunciation of the Kanji, and the Japanese Roman words; taking the codes of Japanese kana to form the codes of the Japanese word and the Kanji character of Japanese pronunciation; and taking the codes of roman alphabets to form the code of the roman word.

(1) The encoding method of Japanese word

The Japanese word is formed by Japanese kana, and its encoding method is: encoding the kana forming the Japanese word; and forming the code of the Japanese word by the codes of the kana.

① The Encoding Method of Japanese Kana

There are 80 Japanese kana, and their encoding method is as follows: using ten numerals from 0 to 9, and using the operational encoding method by areas and positions to number the divided ten areas with one numeral for one area; dividing each area into five positions 1-5 or six positions 1-6; distributing the 80 Japanese kana into any 51 positions in the ten areas; and taking the area code or the area and position codes of the kana to form the code of the kana.

Wherein, the Japanese kana operationally encoded by areas (0-9) and positions are as follows (as shown in FIG. 7):

Positions 1-5 of area 0 are correspondingly for:

あ(ア), い(イ), う(ウ), え(エ), お(オ)

Positions 1-5 of area 1 are correspondingly for:

かが(カガ), きぎ(キギ), くぐ(クグ), けげ(ケゲ), こご(コゴ)

Positions 1-5 of area 2 are correspondingly for:

さざ(サザ), しじ(シジ), すず(スズ), せぜ(セゼ), そぞ(ソゾ)

Positions 1-5 of area 3 are correspondingly for:

ただ(タダ), ちぢ(チヂ), つづっ(ツヅッ), てで(テデ), とど(トド),

Positions 1-5 of area 4 are correspondingly for:

な(ナ)，に(二)，，ぬ(ヌ)，ね(ネ)，の(ノ)，

Positions 1-5 of area 5 are correspondingly for:

はばぱ(ハバパ)，ひびぴ(ヒビピ)，ふぶぷ(フブプ)，へべぺ(ヘベペ)，ほぼぽ(ホボポ)，

Positions 1-5 of area 6 are correspondingly for:

ま(マ)，み(ミ)　む(ム)，，め(メ)，も(モ)，

Positions 1-5 of area 7 are correspondingly for:

やゃ(ヤャ)，　い(イ)，　ゆゅ(ユュ)，　え(エ)，よょ(ヨョ)，

Positions 1-5 of area 8 are correspondingly for:

ら(ラ)，り(リ)，，る(ル)，れ(レ)，，ろ(ロ)

Positions 1-6 of area 9 are correspondingly for:

わ(ワ)，ゐ(ヰ)，う(ウ)，，ゑ(ヱ)，を(ヲ)，ん(ン)

(2) Based on the Above Codes of Japanese Kana, Forming the Code of the Japanese Word By the Area Codes or Area and Position Codes of Japanese kana.

For example: in the operational encoding of Japanese kana by areas (10 areas) and positions 0-9, for "わたし", the area code of "わ" is 4, its area and position codes is 44; the area code of "た" is 3, its area and position codes is 31; the area code of "し" is 2, its area and position codes is 22, so the code of the kana "わたし" is 432 or 44(わ), 31(た) and 22(し).

(2) The encoding method of Kanji character

Chinese characters have different pronunciations in different countries, typically comprising the Chinese pronunciation, Japanese pronunciation, and Korean pronunciation. The encoding of Kanji character can be based on their Japanese pronunciations, or carried out by the method for digital operational encoding according to the glyph of the Chinese character.

The digital operational encoding method for the Japanese pronunciation of Kanji character The Japanese pronunciation of Kanji character is represented by Japanese kana, and the encoding method of Kanji character is as follows: encoding the kana representing the Japanese pronunciation of Kanji character, and forming the code of Kanji character by the codes of the kana. Refer to the kana encoding method in the encoding method of Japanese word for the encoding of Japanese kana.

For example: the Japanese pronunciation of "我" is "わたし"; in the operational encoding of Japanese kana by areas (10 areas) and positions 0-9, the area code of "わ" is 4, its area and position codes is 44; the area code of "た" is 3, its area and position codes is 31; the area code of "し" is 2, its area and position codes is 22, so the code of character "我" is 432 or 44(わ), 31(た) and 22(し).

(3) The encoding method of Japanese Roman Words

For the encoding method of Japanese Roman words, refer to the digital operational encoding method of English character.

1.1.4. The encoding method of punctuations and symbols

The encoding method of punctuations and symbols is: according to the glyph of a punctuation or symbol, with ten numerals from 0 to 9, using the operational encoding method by addition, subtraction, and position to encode the strokes forming the glyph of the punctuation; taking the codes of the strokes to form the code of the punctuation or symbol; and according to the category of the punctuation and symbol, performing the encoding by punctuation and special symbol.

(1). The encoding method of punctuation

The encoding method of punctuation is as follows: classifying the strokes of a punctuation into five basic strokes, i.e., the horizontal (-), vertical (|), left-falling (╱), dot (丶), and hook (乙), defined with codes of 1, 2, 3, 4, and 5 respectively; adding the codes of strokes of the punctuation and performing the operation of subtracting ten if the sum is equal to or over ten on the summation result to get the code of the punctuation; classifying the punctuations into single punctuations and dual punctuations according to the number of elements forming the punctuations, and encoding them respectively.

①. The codes of single punctuations the code of full stop (。) is 0; the code of hyphen (-) and dash (—) is 1; the code of comma (,) is 3; the code of caesura sign (、), separation mark (.), emphasis mark (.), and ellipsis ( . . . ) is 4; the code of exclamation mark (!) is ; the code of semicolon (;) is 7; the code of colon (:) is 8; and the code of question mark (?) is 9.

Figure 29:
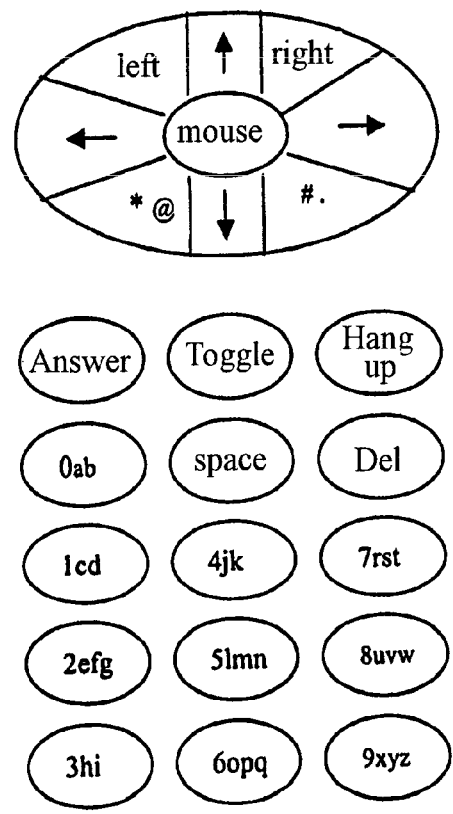
FIG. 29 shows the brief settings of mouse keypad.

②. The codes of dual punctuations:

the code of single book-title mark (〈 〉) is 55; the code of double book-title mark (《 》) is 10; the code of the vertical single quotation mark (「 」) is 55; the code of vertical double quotation mark ("") is 00; the code of horizontal double quotation mark (" ") is 86; the code of horizontal single quotation mark (' ') is 43; the code of bracket ( ) is 43; the code of hollowed square bracket (〖 〗) is 09; the code of solid square bracket (【 】) is 09 (as shown in FIG. 29).

(2). The encoding method of special symbols

The encoding method of special symbol is: using ten numerals from 0 to 9, and encoding with the method of operational encoding by positions.

The codes of special symbols are respectively as follows: the code of blank, plus, subtraction, times, and division is 0; and the codes of &, $, %, £, Θ, =, Ψ, Ω, Π, and @ are 00, 01, 02, 03, 04, 05, 06, 07, 08, and 09 respectively.

1.1.5. The codes of numbers

零，〇，and 0 are encoded to 0; 壹，一，and 1 are encoded to 1; 貳，二，and 2 are encoded to 2; 叄，三，and 3 are encoded to 3; 肆，四，and 4 are encoded to 4; 伍，五，and 5 are encoded to 5; 陆，六，and 6 are encoded to 6; 柒，七，and 7 are encoded to 7; 捌，八，and 8 are encoded to 8; 玖，九，and 9 are encoded to 9; 拾 and + are encoded to 10.

The Chinese characters (ideograph character), linear characters, punctuations and symbols, and numbers can be encoded by the above digital operational encoding method of world character information.

1.2. The digital input method of world character information

The digital input method of world character information is as follows: based on the digital operational encoding method of world character information of the present invention, encoding a character needed to be input to get the digital code of the character; using ten numerals from 0 to 9 to input the code; using the space bar or Enter to indicate the completion of inputting the code of the character; using keys with Page Up and Page Down function or other arrow keys to select the character needed to be input from the candidate character column, confirming the selected character in the candidate character column with number keys 0-9 or the space bar to complete the digital input of the character. According to the categories of world characters, classifying the world characters into Chinese character (ideograph character), linear character, punctuations, symbols, and numbers and input them separately.

1.2.1. Block ideograph character—the digital input method of Chinese character

The digital input method of Chinese character is as follows: based on the digital operational encoding method of world character information of the present invention, encoding a character needed to be input to get the digital code of the character; using ten numerals from 0 to 9 to input the code; using the space bar or Enter to indicate the completion of inputting the code of the character; using keys with Page Up and Page Down function or other arrow keys to select the character needed to be input from the candidate character column, confirming the selected character in the candidate character column with number keys 0-9 or the space bar to complete the digital input of the character. Based on the glyph and pronunciation of the Chinese characters, the digital input method of Chinese character is divided into the method of inputting Chinese character by its glyph; the method of inputting Chinese character by its pronunciation; and the method of inputting Chinese character by the combination of its glyph and pronunciation.

(1). The method of inputting Chinese character by its glyph

① Based on the digital operational encoding method of world character information of the present invention, encoding the Chinese character needed to be input to get the digital code of the glyph of the Chinese character.

② Using ten number keys 0-9 to input the code of Chinese character sequentially; pressing the space bar or Enter to confirm the completion of inputting the code of the Chinese character; and for the characters with same code, inputting the code of the initial consonant of that character.

or

③ Using keys with Page Up and Page Down function or other arrow keys to select the Chinese character needed to be input in the candidate character column.

④ Using ten number keys 0-9 or the space bar to confirm the selected Chinese character in the candidate character column, thereby completing the digital input of the Chinese characters.

For example: taking character "中" as an example. Based on the digital operational encoding method by the glyph of Chinese character according to the present invention, encoding character "中" to get the digital code 82 of its glyph; using keys 0-9 to type the code 82 in sequence, and pressing the space bar or Enter to confirm the completion of inputting the code of character "中"; using Page Up and Page Down function to select character "中" in the candidate character column; using keys 0-9 or the space bar to confirm the selected character "中" in the candidate character column, thereby completing the digital input of character "中".

Taking "我说个笑话给你听" as another example, based on the digital operational encoding method by the glyph of Chinese character according to the present invention, encoding the sentence of "我说个笑话给你听" to get the digital code 49789158 of its glyph; using keys 0-9 to type the code 49789158, and pressing the space bar or Enter to confirm the completion of inputting the code of sentence "我说个笑话给你听", thereby competing the digital input of sentence "我说个笑话 给你听".

(2). The method of inputting Chinese character by its pronunciation

① Based on the digital operational encoding method by the pronunciation of Chinese character according to the present invention, encoding the Chinese character needed to be input to get the digital code of the pronunciation of the Chinese character;

② Using ten number keys 0-9 to input the code sequentially; pressing the space bar to confirm the completion of inputting the code of the Chinese character;

③ Using keys with Page Up and Page Down function or other arrow keys to select the Chinese characters needed to be input in the candidate character column.

④ Using ten number keys 0-9 or the space bar to confirm the selected Chinese character in the candidate character column, thereby completing the digital input of the Chinese characters.

For example: The PinYin of character "中" is "zhōng". Based on the digital operational encoding method by the pronunciation of Chinese character according to the present invention, encoding "zhōng" to get its code 81831; using keys 0-9 to type the code 81831, and pressing the space bar or Enter to confirm the completion of inputting the code of "zhōng"; Using keys with Page Up and Page Down function or other arrow keys to select character "中" in the candidate character column; using keys 0-9 or the space bar to confirm the selected character "中" in the candidate character column, thereby completing the digital input of character "中".

Or,

① Based on the digital operational encoding method by the pronunciation of Chinese character according to the present invention, encoding the alphabets (including the initial consonant, final, kana, vowel, and consonant alphabets) forming the phonetic syllables of Chinese character and the tone to get the digital code of the syllables.

② Using ten number keys 0-9 to input the codes of syllables sequentially; pressing the space bar or Enter to confirm the completion of inputting the codes of the syllables.

③ Using ten number keys 0-9 or the space bar to confirm the phonetic syllables of the Chinese character in the prompt bar.

④ Using keys with Page Up and Page Down function or other arrow keys to select the Chinese characters needed to be input in the candidate character bar.

⑤ Using ten number keys 0-9 or the space bar to confirm the selected Chinese character in the candidate character column, thereby completing the digital input of the Chinese characters.

For example: The Chinese phonetic syllables of Character "中" consists of "zhōng". Based on the digital operational encoding method by the pronunciation of Chinese character according to the present invention, encoding "zhōng" to get its code 881; using keys 0-9 to type the code 881, and pressing the space bar or Enter to confirm the completion of inputting the code of "zhōng"; Using keys 0-9 or the space bar to confirm the PinYin syllables of "zhōng" in the prompt bar; Using keys with Page Up and Page Down function or other arrow keys to select character "中" in the candidate character column; using keys 0-9 or the space bar to confirm the selected character "中" in the candidate character column, thereby completing the digital input of character "中".

Or,

① Based on the digital operational encoding method by the pronunciation of Chinese character according to the present invention, encoding the alphabets (including the initial consonant, final, kana, vowel, and consonant alphabets) forming the phonetic syllables of Chinese character and the tone to get the area and position codes of the alphabets.

② Using ten number keys 0-9 to input the area and position codes of the alphabets (including the initial consonant, final, kana, vowel, and consonant alphabets) sequentially; pressing the space bar or Enter to confirm the completion of inputting the codes of the alphabets.

③ Using ten number keys 0-9 or the space bar to confirm the phonetic syllables of the Chinese character in the prompt bar.

④ Using keys with Page Up and Page Down function or other arrow keys to select the Chinese characters needed to be input in the candidate character bar.

⑤ Using ten number keys 0-9 or the space bar to confirm the selected Chinese character in the candidate character column, thereby completing the digital input of the Chinese characters.

For example: The Chinese phonetic syllables of Character "中" is "zhōng". Based on the digital operational encoding method by the pronunciation of Chinese character according to the present invention, encoding "zh" and "ong"; using keys 0-9 to type the area and position codes 81 of "zh", and pressing the space bar to confirm the completion of inputting the code of "zh"; typing in the area and position codes 83 of "ong", and pressing the space bar or Enter to confirm the completion of inputting the code of "ong"; Using keys 1-4 or the space bar to confirm the syllable "zhōng" marked with tone in the prompt bar; Using keys with Page Up and Page Down function or other arrow keys to select character "中" in the candidate character column; using keys 0-9 or the space bar to confirm the selected character "中" in the candidate character column, thereby completing the digital input of character "中".

(3). The digital operational encoding and inputting method of Chinese character by pronunciation and glyph of Chinese character ① Based on the digital operational encoding method by pronunciation and glyph of Chinese character according to the present invention, encoding the Chinese character needed to be input to get the digital code of pronunciation and glyph of the Chinese character.

② Using ten number keys 0-9 to input the code of the character sequentially; pressing the space bar or Enter to confirm the completion of inputting the code of the Chinese character.

③ Using keys with Page Up and Page Down function or other arrow keys to select the Chinese characters needed to be input in the candidate character column.

④ Using ten number keys 0-9 or the space bar to confirm the selected Chinese character in the candidate character column, thereby completing the digital input of the Chinese characters.

For example: taking character "中" as an example. Based on the digital operational encoding method by pronunciation and glyph of Chinese character, encoding "中" to get its code 8882; using keys 0-9 to type the code of character "中" sequentially, and pressing the space bar or Enter to confirm the completion of inputting the code of "中"; Using keys with Page Up and Page Down function or other arrow keys to select character "中" in the candidate character column; using keys 0-9 or the space bar to confirm the selected character "中" in the candidate character column, thereby completing the digital input of character "中".

1.2.2. The digital input method of the block phonetic character and the linear character The digital input method of the block phonetic character and the linear character is as follows: based on the digital operational encoding method of world character information according to the present invention, encoding the block phonetic character or the linear character needed to be input to get the digital code of the block phonetic character or the linear character; using ten numerals from 0 to 9 to input the code; using the space bar or Enter to confirm the completion of inputting the code of the block phonetic character or the linear character; Using keys with Page Up and Page Down function or other arrow keys to select the block phonetic characters or the linear characters needed to be input in the candidate character column, and using ten number keys 0-9 or the space bar to confirm the selected block phonetic character or the linear character in the candidate character column, thereby completing the digital input of the block phonetic characters or the linear characters.

(1) The digital input method of block phonetic character—Korean character

① Based on the digital operational encoding method of world character information according to the present invention, encoding the Korean character needed to be input to get the digital code of the Korean character;

② Using ten number keys 0-9 to input the code of Korean character sequentially; pressing the space bar or Enter to confirm the completion of inputting the code of the Korean character;

③ Using keys with Page Up and Page Down function or other arrow keys to select the Korean characters needed to be input in the candidate character column;

④ Using ten number keys 0-9 or the space bar to confirm the selected Korean character in the candidate character column, thereby completing the digital input of the Korean characters.

For example: taking "경제" as an example, based on the digital operational encoding method of world character information according to the present invention, deriving the digital code 5092 of "경제"; using keys 0-9 to type the code 5092, and pressing the space bar or Enter to confirm the completion of inputting the code of "경제"; Using keys with Page Up and Page Down function or other arrow keys to select "경제" in the candidate character column; using keys 0-9 or the space bar to confirm the selected "경제" in the candidate character column, thereby completing the digital input of "경제" character.

(2). The digital input method of linear character:

① Based on the digital operational encoding method of world character information according to the present invention, encoding the linear character needed to be input to get the digital code of the linear character;

② Using ten number keys 0-9 to input the code of linear character sequentially; pressing the space bar or Enter to confirm the completion of inputting the code of the linear character.

③ Using keys with Page Up and Page Down function or other arrow keys to select the linear characters needed to be input in the candidate character column.

④ Using ten number keys 0-9 or the space bar to confirm the selected linear character, thereby completing the digital input of the linear characters.

For example: taking "china" as an example, based on the digital operational encoding method of world character information according to the present invention, deriving the digital code 13341 of "china"; using keys 0-9 to type the code 13341, and pressing the space bar or Enter to confirm the completion of inputting the code of "china"; Using keys with Page Up and Page Down function or other arrow keys to select "china" in the candidate character column; using keys 0-9 or the space bar to confirm the selected "china" in the candidate character column, thereby completing the digital input of "china" character.

Or,

① Based on the digital operational encoding method of world character information according to the present invention, encoding the alphabets forming the linear character to get the area and position codes of the alphabets.

② Using ten number keys 0-9 to input the area and position codes of the alphabets sequentially; pressing the space bar or Enter to confirm the completion of inputting the codes of the alphabets.

③ using ten number keys 0-9 or the spacer bar to confirm the selected alphabets in the candidate column, thereby completing the digital input of the linear character.

For example: taking "china" as an example, based on the digital operational encoding method of world character information according to the present invention, deriving the area and position codes 13, 31, 32, 43, 11 of the alphabets (i.e., elements) c, h, i, n, and a forming "china"; typing the area and position codes 13 of "c", pressing the space bar or the Enter, and using the number key or the space bar to confirm the c in the candidate character column; typing in the area and position codes 31 of "h", pressing the space bar or the Enter, and using the number key or the space bar to confirm the h in the candidate column; typing in the area and position codes 32 of "i", pressing the space bar or the Enter, and using the number key or the space bar to confirm the i in the candidate column; typing in the area and position codes 43 of "n", pressing the space bar or the Enter, and using the number key or the space bar to confirm the n in the candidate column; typing the area and position codes 11 of "a", pressing the space bar or the Enter, and using the number key or the space bar to confirm the a in the candidate column; thereby completing the digital input of "china".

Or

① Based on the digital operational encoding method of world character information according to the present invention, encoding the alphabets forming the linear character to get the area and position codes of the alphabets;

② Using ten number keys 0-9 to input the area and position codes of the alphabets sequentially; pressing the space bar or Enter to confirm the completion of inputting the code of the linear character, thereby completing the digital input of linear character.

For example: taking "china" as an example, based on the digital operational encoding method of world character information according to the present invention, deriving the area and position codes 13, 31, 32, 43, 11 of the alphabets (i.e., elements) c, h, i, n, and a forming "china"; typing the area and position codes 13 of "c"; typing the area and position codes 31 of "h"; typing the area and position codes 32 of "i"; typing the area and position codes 43 of "n"; typing the area and position codes 11 of "a"; and pressing the space bar or Enter to confirm the completion of inputting the codes of "china", thereby completing the digital input of "china".

Or,

① Based on the digital operational encoding method of world character information according to the present invention, encoding the alphabets forming the linear character to get the area codes of the alphabets;

② Using ten number keys 0-9 to input the area codes of the alphabets sequentially; pressing the space bar or Enter to confirm the completion of inputting the codes of the alphabets;

③ using ten number keys 0-9 or the spacer bar to confirm the selected alphabets in the candidate column, pressing the space bar or Enter to confirm the completion of inputting the code of the linear character, thereby completing the digital input of linear character.

For example: taking "china" as an example, based on the digital operational encoding method of world character information according to the present invention, deriving the area codes 1, 3, 3, 4, 1 of the alphabets (i.e. elements) c, h, i, n, and a forming "china"; typing the area code 1 of "c", pressing the space bar or Enter, and using number key 1 to confirm the c in the candidate column; typing the area code 3 of "h", pressing the space bar or the Enter, and using number key 1 to confirm the h in the candidate column; typing the area code 3 of "i", pressing the space bar or the Enter, and using number key 2 to confirm the i in the candidate column; typing the area code 4 of "n", pressing the space bar or the Enter, and using number key 3 to confirm the n in the candidate column; typing the area code 1 of "a", pressing the space bar or the Enter, and using number key 1 to confirm the a in the candidate column; and pressing the space bar or Enter to confirm the completion of inputting the codes of "china", thereby completing the digital input of "china".

1.2.3. The digital input method of hybrid character—Japanese character

① Based on the digital operational encoding method of world character information according to the present invention, encoding the Japanese word, Kanji character, Japanese Roman word to get their digital codes;

① Using ten number keys 0-9 to input the codes of the Japanese word, Kanji character, Japanese Roman word sequentially; pressing the space bar or Enter to confirm the completion of inputting their codes;

① Using keys with Page Up and Page Down function or other arrow keys to select the Japanese word or Kanji character or Japanese Roman word needed to be input in the candidate character column;

① Using ten number keys 0-9 or the space bar to confirm the selected Japanese word or Kanji character or Japanese Roman word, thereby completing the digital input of the Japanese word or Kanji character or Japanese Roman word in the same state.

Example: taking "china" as an example, based on the digital operational encoding method of world character information according to the present invention, deriving the digital code 13341 of "china"; using keys 0-9 to type the code 13341, and pressing the space bar or Enter to confirm the completion of inputting the code of "china"; using the Page Up and Page Down function to select "china" character in the candidate character column; using keys 0-9 or the space bar to confirm the selected "china" character in the candidate character column, thereby completing the digital input of "china" character.

1.2.4. The digital input method of punctuations and symbols

The digital input method of punctuations and symbols is as follows: based on the digital operational encoding method of world character information according to the present invention, encoding the punctuation or symbol needed to be input to get its digital codes; using ten numerals from 0 to 9 to input the codes; using the space bar or Enter to confirm the completion of inputting the codes of the punctuation or symbol; Using keys with Page Up and Page Down function or other arrow keys to select the punctuation or symbol needed to be input in the candidate character column; using ten number keys 0-9 or the space bar to confirm the selected punctuation or symbol in the candidate column, thereby completing the digital input of the punctuation.

For example: taking the caesura sign "、" as an example, based on the digital operational encoding method of world character information according to the present invention, deriving the code 4 of the caesura sign; typing in the code 4 of the caesura sign; pressing the space bar or Enter to confirm the completion of inputting the code of the caesura sign; Using keys with Page Up and Page Down function or other arrow keys to select the caesura sign "、" in the candidate character column; using a number key to confirm the selected caesura sign "、" in the candidate column.

1.2.5. The input method of number

The input method of number is as follows: based on the digital operational encoding method of world character information according to the present invention, encoding the number needed to be input to get the code of the number; using ten numerals from 0 to 9 to input the code; using the space bar or Enter to confirm the completion of inputting the code of the number; Using keys with Page Up and Page Down function or other arrow keys to select the number needed to be input in the candidate character column; using ten number keys 0-9 or the space bar to confirm the selected number in the candidate column, thereby completing the input of the number.

For example: taking number " 八 " or " 捌 " as an example, based on the digital operational encoding method of world character information according to the present invention, deriving the code 8 of number " 八 " or " 捌 "; typing the code 8 of number " 八 " or " 捌 "; pressing the space bar or Enter to confirm the completion of input the code of number " 八 " or " 捌 "; Using keys with Page Up and Page Down function or other arrow keys to select the number " 八 " or " 捌 " in the candidate column; using a number key to confirm the selected number " 八 " or " 捌 " in the candidate column, thereby completing the input of number " 八 " or " 捌 ".

2. The encoding and input processing device of world character information

The encoding and input processing device of world character information includes: the constituent parts of the device, and the operating flow of the device.

2.1. The constituent parts of the device

The constituent parts of the device is comprised of hardware and software, of which the hardware includes keyboard, mouse, host computer, monitor, key display, printer, Modem, router; and the software includes the information exchanging codes, built-in codes, world character base, font pattern codes, font exchanging code; wherein:

2.1.1. The display window for keypad or similar key positions includes character keys and function keys, with its illustration setting shown in FIG. 29.

(1) The character keys are ten number keys 0-9, marked with numbers, Chinese radicals, PinYin alphabets, Chinese phonetic notation alphabets, linear character alphabets, punctuations, and symbols. The number keys are equipped with displays, with the content displayed on each key position corresponding to the characters of different input states (The illustration settings of the numerical keypad are shown in FIG. 29).

For the number key 1, the Chinese character radicals set thereon are: _, 犭, 门, 已, 弓, 子, , 马, 钅(金); ; the PinYin alphabets are: a, b, c, d, p, o; the Chinese phonetic notation alphabets are: ㄅ, ㄆ, ㄚ, ㄛ; ; the linear character alphabets are: Aa, Aa, AàBb, Cc, Dd, Б ь, Вв , Г г, АА, Б Б, А α, Β β, ㄱ 、ㄴ 、ㄷ 、ㅏ 、ㅑ 、ㅗ 、ㅛ 、 ㅈ 、ㅊ 、あ(ア), , い(イ), , う(ウ), え(エ), お(オ), , か(カ), き(キ), く(ク), け(ケ), こ(コ); ; the punctuations and symbols are: hyphen and dash; and the numbers are: 壹, 一, , 1.

For the number key 2, the Chinese character radicals set thereon are: 丨, 二, 小, 夕, 久, 一; ; the PinYin alphabets are: c, d, e, f, g, m, I; the Chinese phonetic notation alphabets are: ㄇ, ㄈ, ㄜ, ㄝ; ; the linear character alphabets are: Cc, Dd, Ee, Ff, Gg, ch, Eé, Г г, Д д, , Жж, З з, , è, E e, Г γ, Δ δ, Ε ε, Ζ ξ, ㄹ 、ㅁ 、ㅂ 、ㅌ 、ㅓ 、ㅕ 、ㅜ 、ㅠ 、ㅡ 、ㅣ 、か が(カガ), きぎ(キギ), , くぐ(クグ), , けげ(ケゲ), , ここ(コゴ), , さ(サ), し(シ), す(ス), せ(セ), そ(ソ), た(タ), ち(チ), , つ(ツ), て(テ), と(ト); ; and the numbers are: 貳, 二, , 2.

For the number key 3, the Chinese character radicals are: 丿, 十, 三, 丶, 之; the PinYin alphabets are: h, i, j, k, d, t, u, ü; the Chinese phonetic notation alphabets are: ㄉ, ㄊ, ㄨ, ㄩ; ; the linear character alphabets are: Ee, Eé, Ff, Gg, Hh, Ii(í), Jj, Kk, И и, Й й, , К к, Л л, Жж, , З з, Н η, Θ θ, Ι ι, Ε ε, Ζ ζ, ㅅ 、ㅇ 、ㅈ 、ㅊ 、ㅋ 、ㅏ 、ㅑ 、ㅓ 、ㅕ 、ㅗ 、ㅛ 、ㅜ 、ㅠ 、 ㅡ 、ㅣ 、さざ(サザ), しじ(シジ), , すず(スズ), , せぜ(セゼ), , そぞ(ソゾ), , な(ナ), に(ニ), ぬ(ヌ), ね(ネ), , の(ノ), は(ハ), , ひ(ヒ), ふ(フ), , へ(ヘ), ほ, ホ; the punctuations and symbols are: comma, horizontal single quotation mark (right side), bracket (right side); and the numbers are: 叁, 三, 3. .

For the number key 4, the Chinese character radicals are: 丶, 厂, 工, 土, 士, , 幺, 火, 干, 丰 ; ; the PinYin alphabets are: l, m, n, h, i, ai, ei; the Chinese phonetic notation alphabets are: ㄋ, ㄌ, ㄞ, ㄟ; ; the linear character alphabets are: Hh, Ii(í), Ll, Mm, Nn, М м, Н н, О о, П π, Й й, К к, Л л, , К к, Λ λ, , Μ μ, Η η, Θ θ, ㅋ 、ㅍ 、ㅌ 、ㅊ 、 ㅅ 、ㅇ 、ㅜ 、ㅠ 、ㅣ 、ㅏ 、ㅑ 、 ㅓ 、ㅕ 、ただ(タダ), ちぢ(チヂ), つづっ (ツヅツ), てで(テデ), , とど(トド), ま(マ), , み(ミ), む(ム), , め(メ), も(モ), , や(ヤ), い(イ), , ゆ(ユ), え(エ), よ(ヨ); ; the punctuations and symbols are: caesura sign, separation mark, emphasis mark, ellipsis, horizontal single quotation mark (left side), and bracket (left side); and the numbers are: 肆, 四, , 4.

For the number key 5, the Chinese character radicals are: 乙, 亻, 亠, 丷, 艹, 巛; ; the PinYin alphabets are: o, p, q, g, k, j, a o, ou; the Chinese phonetic notation alphabets are: ㄍ, ㄎ, ㄠ, ㄡ; ; the linear character alphabets are: Jj, Kk, Oo(ó) O(O)o(o), Pp, Qq, Ll, Pp, Cc, Tt, Yy, М м, Н н, Oo, П π, N v, ≡ ξ, О о, Ι ι, К к, ㅍ 、ㅎ 、ㅏ 、ㅑ 、ㅓ 、 ㅈ 、ㅊ 、ㅡ 、ㅣ 、ㅗ 、ㅛ 、ㅜ 、ㅠ 、 な(ナ), に(ニ), ぬ(ヌ), , ね(ネ), の(ノ), ら(ラ), , り(リ), る(ル), れ(レ), ろ(ロ), わ(ワ), ゐ(ヰ), ), う(ウ), ゑ(ヱ), を(ヲ); ; the punctuations and symbols are: single book-title mark, and vertical single quotation mark; and the numbers are: 伍, 五, 5.

For the number key 6, the Chinese character radicals are: 匸, 卜, 廾; ; the PinYin alphabets are: l, m, n, r, s, t, h, j, n, en; the Chinese phonetic notation alphabets are: ㄏ, ㄐ, ㄢ, ㄣ; ; the linear character alphabets are: Rr, Ss, Tt, Ll(ll), Mm, Nn, Ф ф, Х х, Ц ц, Ч ч, , Pp, Cc, П π, Ρ ρ, Σ σ, Π π, Ρ ρ, Σ σ, ㅂ 、ㅈ 、ㅉ 、ㅏ 、ㅓ 、ㅑ 、ㅕ 、ㅣ 、 ㅏ 、ㅑ 、•、 (、ㅊ 、ㅉ 、は ば ぱ(ハバパ), ひ び ぴ(ヒビピ), ふ ぶ ぷ(フブプ), へ べ ぺ(ヘベペ), ほ ぼ ぽ(ホボポ), が ほ ぼ ぽ(ホボポ), が, (ガ), ぎ(ギ), ぐ(グ), げ(ゲ), ご(ゴ), ざ(ザ), じ(ジ), ず(ズ), ぜ(ゼ), だ(ヅ); the punctuations and symbols are: exclamation mark; horizontal double quotation mark; and the numbers are: 陆, 六, 6.

For the number key 7, the Chinese character radicals are: 刂, 冂, 八, 力, 人, 入, 卩, 阝, 凵; the PinYin alphabets are: r, s, t, u, v, w, q, r, ang, eng; the Chinese phonetic notation alphabets are: ㄑ, ㄒ, ㄓ, ㄤ; ; the linear character alphabets are: Oo, Pp, Qq, Uu(ù)U(ü)u(ü), Vv, Ww, Nn, Oo(ó) O(O)o (o), Pp, Qq, Ш ш, Щ щ, Ъ ъ, Ы ы, Yy, Ф ф, Х х, Т т, Υ υ, Φ φ, Ν ν, ≡ ξ, Ο ο, ㅗ 、ㅛ 、 ㅜ 、ㅠ 、 ㅓ 、ㅕ 、ㅍ 、 ㅎ 、ㅔ 、ㅖ 、

ڤ 、ﯗ、ۋ、ې、ﺕ、ま(マ)、み(ミ)
む(ム)、め(メ)、も(モ)、だ(ダ)、ぢ(ヂ)、づ(ヅ)、
で(デ)、ど(ド)、ば(バ)、び(ビ)、ぶ(ブ)、べ(ベ)、ぼボ；
the punctuation is: semicolon; and the numbers are: 柒、七、7．

For the number key 8, the Chinese character radicals are:
勹、犭、几、一、刀、力、大、口、囗、彳、广; the PinYin alphabets are: u, v, w, x, y, z, zh, ch, ong, ie; the Chinese phonetic notation alphabets are: ㄗ、ㄕ、ㄖ、ㄥ; the linear character alphabets are: Rr, Ss, Tt, β, Xx, Yy, Zz, Цц、Чч、Шш、 Ъъ、Зэ、Юю、Яя、Пπ、Pρ、Σσ、Xχ、Ψω、ΩË、ㅠ、ㅡ、ㅣ、ㅗ、ㅛ、ㅆ、ㅃ、ㅏ、ㅐ、ㄹ、ㅌ、ㄸ、ㄷ、ㅈ、ㄹ、や
や(ヤヤ)、い(イ)、ゆゅユユ)、え(エ)、 よょ(ヨヨ)、
ぱ(パ)、ぴ(ピ)、ぷ(プ)、ぺ(ペ)、ぽ(ポ )、ん(ン)、っ(ッ)、ゃ(ャ)、ゅ(ュ)、ょ ヨ; the punctuations and symbols are: colon, and horizontal double quotation mark; and the numbers are: 捌、八、8.

For the number key 9, the Chinese character radicals are:
讠、厶、爻、小、巾、山、尢、忄、氵、尸、女、彡、日、曰; the PinYin alphabets are: x, y, z, sh, r, in, ün; the Chinese phonetic notation alphabets are: ㄆ、ㄘ、ㄙ、ㄝ、; the linear character alphabets are: Uu(ù)(ü), Vv, Ww, Щщ、Ъъ、Ыы、Тт、 Yu、Φφ、ㅜ、ㅡ、ㅃ、ㅆ、ㅓ、ㅕ、ㄹ、ㄹ、ㅎ(ㄹ)、リ(リ)、る(ル)、
れ(レ)、ろ(ロ); the punctuations and symbols are: question mark, solid square bracket, hollowed square bracket; and the numbers are: 玖、九、9.

For the number key 0, the Chinese character radicals are:
⺁、寸、弋、火 、木、月; the PinYin alphabets are: x, y, z, c, s, ing; the linear character alphabets are: Xx, Yy, Zz, Ъъ、Зэ、Юю、Яя、Xχ、ΨΨ、ΩË、ㅡ、ㅣ、ㅆ、ㅔ、ㅣ、ㅓ、ㅗ、f
わ(ワ)、ゐ(ヰ)、う(ウ)ゑ(ヱ)、を(ヲ)、ん(ン); the punctuations and symbols are: full stop, double book-title mark, vertical doubt quotation mark, hollowed square bracket, solid square bracket, space, plus, minus, times sign, division sign, &, $, %, £, Θ, ≡, Ψ, Ω, Π, @; and the numbers are: 零、O、0₀

(2) The function keys are: answer (yes) key, hang-up (no) key, toggle key, space key, deletion key, mouse (confirm) key, left-click (exit) key, right-click key, cursor up key, cursor down key, cursor left key, cursor right key, * (@) key, and # (.) key.

2.1.2. The display screen is configured with prompt column, candidate character column, and text edit column, wherein the prompt column comprises code input box and character display box (as shown in FIG. 28).

Prompt column:
The code input box displays the input code.
The character display box displays the alphabets or syllables and their position code.
The candidate character column: display the world character, symbols, and numbers needed to be selected.
The text edit column: display the selected world character, symbols, and numbers.

2.2. Operating flow of the processing device
The operating flow of the processing device is as follows: press number keys corresponding to Chinese radicals, PinYin alphabets, Chinese phonetic notation alphabets, linear character alphabets, kana of the hybrid character, punctuations, symbols, or numbers in the numerical keypad or the like, on which some keys are equipped with display window configured with Chinese radicals, linear character alphabets, kana of the hybrid character, punctuations, symbols, and numbers, the digital code corresponding to the Chinese radical, PinYin alphabet, Chinese phonetic notation alphabet, linear character alphabets, kana of the hybrid character, punctuation, symbol, or the number will be outputted from the keypad or the like; the digital code is retrieved in the world character database via software, and the retrieving result can be outputted to the display screen of the monitor for display via software, or to the printer to print the world characters, and the codes of world characters can be transferred to other processing device of world character information for processing by means of wire or wireless transmission.

By taking advantage of the above encoding and input method of world character information and the processing device thereof, the world character information can be encoded and inputted, and are widely used for the computer systems and communication systems.

The method of encoding, sorting and retrieving the world character and the retrieving system thereof.

The method of encoding, sorting and retrieving the world character and its retrieving system according to the present invention are described below.

The method of encoding, sorting and retrieving the world character encoding and its retrieving system include: the method of encoding, sorting and retrieving the world character, and the world character sorting and retrieving system.

1. The method of encoding, sorting and retrieving the world character

The method of encoding, sorting and retrieving the world character comprises the encoding method, sorting method, and retrieving method.

1.1. The encoding method of world character
The encoding method of world character is to encode the world character by the digital operational encoding method of world character information of the present invention.

1.2. The sorting method of world character
The sorting method of world character comprises: the sorting method for the press publishing retrieving system, and the sorting method for the electronic publishing retrieving system.

1.2.1. The sorting method of world character for the press publishing retrieving system
The sorting method of world character for the press publishing retrieving system includes: the sorting method for the retrieving system of the press publishing for block ideograph character—Chinese character; and the sorting method for the retrieving system of the press publishing for the block phonetic character—Korean or linear character or Japanese word.

(1). The sorting method for the retrieving system of the press publishing for Chinese character
The sorting method for the retrieving system of the press publishing of Chinese character comprises: the sorting method of index, and the sorting method of text.

①. The sorting method of index
The sorting method of index includes: the Chinese operational encoding, sorting method of index, the sorting method of index of Chinese radical; the sorting method of index of PinYin syllable, the sorting method of the index of Chinese phonetic notation syllable, and the sorting method of index of word entry category.

A: The Chinese operational encoding, sorting method of index

The Chinese operational encoding, sorting method includes: the sorting method by single character index; the sorting method by phrase index, and the sorting method by index of the combination of single character and phrase.

a. The sorting method by single character index

The sorting by single character index consists of three columns arranged from left to right the digital codes of single character, the single character, and the page number and location code of single character, or two columns arranged from left to right the digital code of single character, the single character, and the page number and location code of single character. The code column of single character is sorted by the order of one code, two codes, three codes, and four codes from the lowest to the highest. The column of single character is arranged at the right side of the code or under the code, while the page number and location code is arranged at the right side of the column of single character.

b. The sorting method by phrase index

The sorting by phrase in the Chinese operational encoding sorting method of index consists of three columns arranged from left to right the codes of phrase, the phrase, and the page number and location code of phrase, or two columns arranged from left to right the codes of phrase, the phrase, and the page number and location code of the phrase. The code column of phrase is sorted by the order of one code, two codes, three codes, and four codes from the lowest to the highest. The page number and location code is arranged at the right side of the column of phrase.

c. The sorting method by index of the combination of single character and phrase The sorting by the combination of single character and phrase in the Chinese operational encoding sorting method of index consists of three columns arranged from left to right of the code of single character, Chinese character, and page number and location code of Chinese character or two columns arranged from left to right of the code of single character, Chinese character, and page number and location code of Chinese character. The code column of single character is sorted by the order of one-digit code, two-digit codes, three-digit codes, and four-digit codes from the lowest to the highest. The column of Chinese character is arranged at the right side of the code or under the code. In the column of Chinese character, a first character of the phrase is arranged in the first row, and the phrases with the same first character are arranged in the second row and thereafter. The page number and location code is arranged at the right side of the column of Chinese characters.

B: The sorting method of index of Chinese radical The sorting of index of Chinese radical includes two parts: the catalog of radicals and the character checklist, wherein:

a. The catalog of radicals

The catalog of radicals consists of two columns of Chinese radicals and page number of character checklist, the column of Chinese radicals is arranged by the stroke number of radicals from the lowest to the highest; and for those radicals with the same number of strokes, arrange them by the order of their first stroke from horizontal, vertical, left-falling, dot, to hook; in the column of radicals with the same number of strokes, the first row shows the number of strokes, and indicates the page number of the character checklist at the right side of the radical.

b. The character checklist

The character checklist consists of two columns of Chinese character, and page number and location code of text. At the left or right upper corner of each page of the checklist, it indicates page number and all Chinese radicals contained in this page. The column of Chinese character is sorted by the number of strokes of Chinese radical from the lowest to the highest. The Chinese characters with the same radical are classified to the same category with the radical indicated in the first row, and arranged by the number of strokes of the remaining part (remaining for short) without the radical from the lowest to the highest. The characters with the same number of strokes of the remaining are classified into the same category, with the number of strokes of the remaining indicated in the first row, and arranged by the order of their first stroke of the remainings from horizontal, vertical, left-falling, dot, to hook. The page number and location code of text is arranged at the right side of each Chinese character.

C: The sorting method of index of Pinyin syllables

The sorting of index of PinYin syllables consists of three columns from left to right of PinYin syllables, the sample character, and page number and location code. The PinYin syllables are sorted by the sequence of PinYin alphabets. The PinYin syllables with the same first pinyin alphabet are classified to the same category, with the first row of each category of syllables indicating the first pinyin alphabet in capital. One sample character is listed at the right side of each syllable, and the page number and location code of text is at the right side of the sample character.

D: The sorting method by index of Chinese phonetic notation syllable

The sorting by index of phonetic notation syllable consists of three columns from left to right of the syllables of phonetic notation, the sample character, and the page number and location code. The syllables of phonetic notation are sorted by the sequence of the alphabets of the phonetic notation. The syllables of the phonetic notation with the same first phonetic notation alphabet are classified into the same category, with the first row of each category of syllables indicating the first alphabet of the phonetic notation syllable in capital. One sample character is listed at the right side of each phonetic notation syllable, and the page number and location code of text is at the right side of the sample character.

E: The sorting method of index of word entry category

The sorting by index of word entry category consists of two columns of the category of word entry and the page number and location code of text. The category of word entry is sorted by the contents of knowledge and the property of the subject, with the first row of each category of word entry indicating the category and property. The word entry of each category are arranged by the number of strokes of its first character from the lowest to the highest, and if the characters having the same strokes, arranging them by the order of their first stroke from horizontal, vertical, left-falling, dot, to hook. The page number and location code of text is listed at the right side of each word entry.

②. The sorting method of text

The sorting of text consists of the prefix of Chinese character and its description, the page number and location code. The prefix of Chinese character and its description are sorted by the sequence of the PinYin syllables, or the syllables of phonetic notation, or by the contents of knowledge and the property of the subject. For the homophones arranged by the sequence of PinYin syllables, or the syllables of phonetic notation, arranging them by the sequence from high-level tone, rising tone, third tone, falling tone, to light tone. The page number is arranged in the blank around each page by the page number from the lowest to the highest. The location code of Chinese character is arranged at the left side of the prefix of Chinese character from the lowest to the highest.

(2). The sorting method for the retrieving system of press publishing for block phonetic character—Korean or linear character or Japanese word The sorting method for the retrieving system of press publishing for block phonetic character—Korean or linear character or Japanese word comprises: the sorting method of index, and the sorting method of text.

①. The sorting method of index

The sorting of index consists of three columns from left to right of the code of Korean or linear character or Japanese word, the Korean or linear character or Japanese word, and the page number and location code of Korean or linear character or Japanese word, or two columns from left to right of the code of Korean or linear character or Japanese word, and the Korean or linear character or Japanese word, and the page number and location code of Korean or linear character or Japanese word. The code column of the Korean or linear character or Japanese word is arranged by code number from the lowest to the highest. The Korean or linear character or Japanese word is arranged at the right side of the codes or under the codes, while the page number and location code are arranged at the right side of the linear characters.

②. The sorting method of text

The sorting of text consists of the prefix of the Korean or linear character or Japanese word and its description, the page number and location code of the Korean or linear character or Japanese word. The prefix and description are arranged in page by the sequence of the Korean alphabets or the linear character alphabets or the kana of Japanese word. The page number is arranged in the blank around each page by the page number from the lowest to the highest. The location code of the Korean or linear character or Japanese word is arranged by location code at the left side of the prefix from the lowest to the highest.

1.2.2. The sorting method of world character for the electronic publishing type of sorting and retrieving system The sorting of world character for the electronic publishing of sorting and retrieving system consists of prompt column, candidate character column, and text column (as shown in FIG. 30), wherein:

(1). The prompt column comprises the code input box and prompt box arranged from left to right; the prompt box comprises the location code of an alphabet or syllable, the alphabet or syllable arranged from left to right;

(2). The candidate character column comprises the location code of world character and the world character arranged from left to right;

(3). The text box comprises the world character and its description arranged from left to right.

1.3. The retrieving method of world character

The retrieving method of world character comprises: the retrieving method of world character for the press publishing sorting and retrieving system, and the retrieving method of world character for the electronic publishing sorting and retrieving system.

1.3.1. The retrieving method of world character for the press publishing sorting and retrieving system The retrieving method of world character for the press publishing sorting and retrieving system comprises: the retrieving method of the block ideograph character—Chinese character, and the retrieving method of the block phonetic character—Korean or linear character or Japanese word (1). The retrieving method of the block ideograph character—Chinese character The retrieving method of Chinese character for the press publishing sorting and retrieving system comprises: the method of retrieving Chinese character by PinYin syllable index; the method of retrieving Chinese character by phonetic notation syllable index, the method of retrieving Chinese character by index of Chinese character radical, the method of retrieving Chinese character by index of the Chinese character code, the method of retrieving Chinese character by the category index of word entry; wherein the method of retrieving Chinese character by index of the Chinese character code can be used independently, or in combination with the above retrieving methods of Chinese character.

①. The method of retrieving Chinese character by index of Pinyin syllables

The method of retrieving Chinese by index of PinYin syllables is as follows: searching the syllable with the same pronunciation, the sample character with the same pronunciation, and the page number and location code in the index of PinYin syllables by the PinYin syllables of the Chinese character; searching the Chinese character and its description needed to be retrieved based on the page number and location code of the sample character with the same pronunciation.

②. The method of retrieving Chinese character by syllables of phonetic notation

The method of retrieving Chinese character by syllable of phonetic notation is as follows: searching the syllable of phonetic notation with the same pronunciation, the sample character with the same pronunciation, and the page number and location code in the syllable index of phonetic notation by Chinese syllables of phonetic notation; searching the Chinese character and its description needed to be retrieved based on the page number and location code of the sample character with the same pronunciation.

③. The method of retrieving Chinese character by index of Chinese radical

The method of retrieving Chinese character by index of Chinese character radical is as follows: based on the number of strokes of Chinese character radical, searching the radical and the page number of the radical in the character checklist in the catalog of Chinese character radicals, and searching the radical in the character checklist based on the page number; according to the number of strokes of the remaining, searching the Chinese character needed to be retrieved and the page number of the text in its column of Chinese character, and searching the Chinese character and its description needed to be retrieved in the text based on the page number and location code of text.

④. The method of retrieving Chinese by index of code of Chinese character

The method of retrieving Chinese character by index of code of Chinese character comprises the retrieving method by index sorted by single character, the retrieving method by index sorted by phrase, and the retrieving method by index sorted by single character and phrase.

A: The retrieving method of Chinese character by index sorted by single character The retrieving method of Chinese character by index sorted by single character is as follows: deriving the code of the Chinese character needed to be retrieved by the digital operational encoding method of world character information according to the present invention; searching the single character needed to be retrieved and the page number and location code in the encoded index based on the code; and searching the single character needed to be retrieved and its description in text based on the page number and location code.

B: The method of retrieving Chinese by index sorted by phrase

The retrieving method of Chinese by index sorted by phrase is as follows: deriving the code of the phrase needed to be retrieved by the digital operational encoding method of world character information according to the present invention; searching the phrase needed to be retrieved and the page number and location code in the index based on the code; and searching the phrase needed to be retrieved and its description in text based on the page number and location code.

C: The method of retrieving Chinese character by index sorted by single character and phrase The retrieving method of Chinese character by index sorted by single character and phrase is as follows: deriving the code of the first character of the phrase needed to be retrieved by the digital operational encoding method of world character information according to the present invention; searching the first Chinese character of the phrase, the phrase and the page number and location code of the phrase in the index based on the code; and searching the phrase needed to be retrieved and its description in text based on the page number and location code.

⑤. The method of retrieving Chinese character by the text of word entry category The method of retrieving Chinese by the text of word entry category is as follows: searching the word entry and page number and location code based on the category of the word entry needed to be retrieved and the number of strokes of the first character in the word entry; and searching the word entry and its description in text based on the page number and location code.

(2). The retrieving method of the block phonetic character—Korean or linear character or Japanese word The retrieving method of the block phonetic character—Korean or linear character or Japanese word is as follows: deriving the code of the Korean or linear character or Japanese word needed to be retrieved by the digital operational encoding method of world character information according to the present invention; searching the Korean or linear character or Japanese word to be retrieved and its page number and location code in the index based on the code; and searching the prefix of the Korean or linear character or Japanese word needed to be retrieved and its description in text based on the page number and location code.

1.3.2. The retrieving method of world character for the electronic publishing sorting and retrieving system The retrieving method of world character for the electronic publishing sorting and retrieving system is: input its codes to retrieve world character by using the digital operational encoding and input method of world character according to the present invention, comprising: the retrieving method of the block ideograph character—Chinese character, the retrieving method of the block phonetic character—Korean or linear character or Japanese word (1). The retrieving method of the block ideograph character—Chinese comprises: the method of retrieving Chinese character by inputting the code of pronunciation syllable of Chinese character, the method of retrieving Chinese character by inputting the code of Chinese character; wherein the method of retrieving Chinese character by inputting the code of Chinese character can be used independently, or in combination with the method of retrieving Chinese character by inputting the code of the alphabet of pronunciation syllable of Chinese character ①. The method of retrieving Chinese character by inputting the code of pronunciation syllable of Chinese character The method of retrieving Chinese character by inputting the code of pronunciation syllable of Chinese character is as follows: based on the phonetic syllable of Chinese character, deriving the code of the pronunciation syllable of the Chinese character needed to be retrieved by the digital operational encoding method of world character information according to the present invention; inputting the code of the syllable in the code input box of the prompt column, and searching the syllable and its location code in the prompt box of the prompt column; inputting the location code of the syllable, and searching the Chinese character needed to be retrieved and its location code in the candidate character column; inputting the location code of the Chinese character, and searching the Chinese character needed to be retrieved and its description in text column.

②. The method of retrieving Chinese character by inputting its code

The method of retrieving Chinese character by inputting its code is as follows: deriving the code of the Chinese character needed to be retrieved by the digital operational encoding method of world character information according to the present invention; inputting the code of the Chinese character in the code input box of the prompt column, and searching the Chinese character needed to be retrieved and its location code in the candidate character column; inputting the location code of the Chinese character needed to be retrieved, and searching the Chinese character needed to be retrieved and its description in the text column.

(2). The retrieving method of the block phonetic character—Korean or linear character or Japanese word The retrieving method of the block phonetic character—Korean or linear character or Japanese word is as follows: deriving the code of the Korean or linear character or Japanese word needed to be retrieved by the digital operational encoding method of world character information according to the present invention; inputting in the code input box of the prompt column the code of the Korean or linear character or Japanese word, and searching the Korean or linear character or Japanese word needed to be retrieved and its location code in the candidate character column; inputting the location code of the Korean or linear character or Japanese word needed to be retrieved, and searching the Korean or linear character or Japanese word needed to be retrieved and its description in the text column.

2. The sorting and retrieving system of world character

The sorting and retrieving system of world character comprises: the sorting and retrieving system of the press publishing in world character, and the sorting and retrieving system of the electronic publishing in world character.

2.1. The sorting and retrieving system of the press publishing in world character The sorting and retrieving system of the press publishing in world character is: use the following eight retrieving methods for various dictionaries, glossaries, wordbooks, manuals, and tool books of Chinese character, Korean, linear character, Japanese word, and world character: the retrieving method by index of PinYin syllable, the retrieving method by syllable index of Chinese phonetic notation, the retrieving method by index of Chinese character radical, the retrieving method by index of Chinese character code, the retrieving method by index of Korean code, the retrieving method by index of linear character code, the retrieving method by index of Japanese word code, and the retrieving method by index of word entry category, wherein the retrieving method by index of Chinese code, the retrieving method by index of Korean code, the retrieving method by index of linear character code, and the retrieving method by index of Japanese word code can be used independently, or in combination with other retrieving methods.

2.2. The sorting and retrieving system of electronic publishing in world character The sorting and retrieving system of electronic publishing in world character is: use the following seven retrieving methods for various computer glossaries, dictionaries and toolbooks, electronic glossaries, dictionaries and toolbooks, optical disc glossaries, dictionaries and toolbooks, magnetic disc glossaries, dictionaries and toolbooks, magnetic tape glossaries, dictionaries and toolbooks, magnetic card glossaries, dictionaries and toolbooks of Chinese character, Korean, linear character, Japanese word, and world character: the retrieving method by index of PinYin syllables, the retrieving method by index of PinYin alphabets code, the retrieving method by index of Chinese phonetic notation alphabets code, the retrieving method by index of Chinese code, the retrieving method by index of Korean code, the retrieving method by index of linear character code, and the retrieving method by index of Japanese word code, wherein the retrieving method by index of PinYin alphabets code, the retrieving method by index of phonetic notation alphabets code, the retrieving method by index of Chinese code, the retrieving method by index of Korean code, the retrieving method by index of linear character code, and the retrieving method by index of Japanese word code can be used independently, or in combination with other retrieving methods.

The programming method of computer programming anguage in world character

The programming method of computer programming anguage in world character for inputting the code of world character by the digital operational encoding method of world character information and its processing device according to the present invention and its execution manner are described below The programming method of computer programming language in world character and its execution manner includes: The programming method of computer programming language in world character, the execution manner of world character.

1. The programming method of computer programming language in world character

The programming method of computer programming language in world character is: Programming with the world character, punctuations, symbols, and numbers as programming characters based on the type, format, contents and application of computer language; encoding and inputting world character by the encoding and input method of world character information and its processing device according to the present invention; classifying the computer language of world character into the machine language, assembly language, high level language for programming based on the classification of computer language.

1.1. The programming method of machine language

The programming method of machine language is:

1.1.1. Using world character, numbers, punctuations and symbols to describe the task to be completed by the machine language.

1.1.2. Using any 4 decimal numbers to indicate the world characters, numbers, punctuations, and symbols that indicate the tasks to be completed by the machine language, or using 4 decimal numbers to encode the world characters, numbers, punctuations, and symbols that indicate the tasks to be completed by the machine language based on the digital operational encoding method of world character information according to the present invention; using the codes of the 4 decimal numbers to indicate the world characters, numbers, punctuations, and symbols that describe the tasks to be completed by the machine language.

1.1.3. Using 4 binary numbers to represent a decimal numeral and totally using 16 binary numbers to represent 4 decimal numerals.

1.2. The programming method of assembly language

The programming method of assembly language is as follows:

1.2.1. Using world characters, numbers, punctuations, and symbols to describe the task to be completed by assembly language.

1.2.2. Using any 4 decimal numerals to indicate the world characters, numbers, punctuations, and symbols that describe the task to be completed by assembly language; or using the 4 decimal numerals to encode the world characters, numbers, punctuations, and symbols that describe the task to be completed by assembly language based on the digital operational encoding method of world character information according to the present invention, and using the codes of the 4 decimal numbers to indicate the world characters, numbers, punctuations, and symbols that describe the tasks to be completed by the assembly language.

1.3. The programming method of high level language

The programming method of high level language is to use the world characters, numbers, punctuations, symbols as programming characters, and programming by the formats of the natural language and the calculation expression based on the contents and application of the high level language.

2. The execution manner of programs written in world character 2.1. Direct execution manner The program written in world character is compiled to produce 16-bit virtual machine codes by the compiler provided by the language, then being interpreted and executed by the interpreter provided by the language.

2.2. Indirect execution manner

The program written in world character is compiled to produce 16-bit virtual machine codes by the compiler provided by the language, then being executed by the interpreter provided by a web browser supporting the computer programming language in world character.

The programming language in world character for diversified application can be programmed by taking advantages of the above programming method in world character and its execution manner.

For example: according to the above method, the characters, constants and variables, data type, operation expression, program flow control, and the input/output of data are as follows:

1. The Characters used by world character computer program language
  (1). The Chinese character;
  (2). The linear character, alphabets: A-Z; kana;
  (3). Ten Arabic numbers 0-9;
  (4). The arithmetic operators: +, −, *, /, %, ++, −−;
  (5). The relation operators: ⟩, ⟩, ⟨=, ⟨, ==, !=;
  (6). The bitwise operators: ⟩, ⟨, >>>, ~, 1, ∧;
  (7). The logic operators: !, 1, ∧, 11;
  (8). The assigning operators: =, OP=(assignment=);
  (9). The condition operators: ?: .

2. The classification of the constants and the variables 2.1. The constants

The constants include data constants, character constants, string constants, true and false constants.

2.1.1 The data constants include the integer constants, floating point number constants.

(1). The integer constants

The integer constants include three types of integers: the octal integers, decimal integers and hex integer. The octal integer are represented at its start bit by Chinese character "八", and the hex integer by Chinese character "十六".

(2). The floating point number constants

The floating-point number constants include two types of constants: single precision type and double precision type, represented by "单 or float" and "双 or double" respectively. The floating-point numbers are represented by decimal number and scientific notation. The constants with "单" at its end bit represents single precision type, with "双" represents double precision type. The constants without Chinese character or alphabet are double precision type as default.

2.1.2. The character constants

The character constants are represented by a Chinese character or alphabeta marked with a pair of single quotation mark.

For example:

2.1.3. The string constants

The string constants are represented by a row of Chinese characters or alphabets marked with a pair of double quotation mark.

For example:

2.1.4. The true and false constants are represented by two values of "真 or true" and "假 or false".

For example:

2.2. The variables

The variables are represented by identifiers, types and domains together, comprising value variables and string variables. The value variables include simple variables and subscripted variables.

2.3. The data type

The data type comprises basic type, array type and class type.

2.3.1. The basic type

The basic type includes integer type, floating point number type, character type, and true and false type.

(1). The integer type

The integer type includes the 8-bit byte type, 16-bit word type, 32-bit two-word type, and 64-bit four-word type with the respective value ranges of $-2^7$-$(2^7-1)$ $1$-$2^{15}$-$(2^{15}-1)$, $-2^{31}$-$(2^{31}-1)$, and $-2^{63}$-$(2^{63}-1)$.

(2). The floating-point number type includes single precision type and double precision type.

The single precision type is 32 bit with the value range of 1.402398466e-45f-3.40262347e+38f. The double precision type is 64 bit with the value range of 4.940656465334e-324-1.79976931348623157e+308.

(3). The character type

The character type is 16-bit word type with the value range of 0-65536.

(4). The true and false type

The true and false type can only take one bit, and its value is logic $0$ 真 or true, and 假 or false.

The integer type, the floating-point number type, and the character type can be operated in a mixed way by type conversion with each other.

2. The array type

The array type includes the integer array, the floating number array, and the character array.

3. The class type

The class type includes interface, package, string processing, exceptions processing, data stream processing, image rendering and processing, character and color, interactive event processing, abstract window tool, image and sound processing, and network functions.

The definition format of type is formed by the object variable and the methods, the object variable defining the internal data format of an object, and the methods defining the behavior of an object.

3. The operation expression

The operation expression is formed by the operators and the operands. It includes the following expressions based on the type of the operations: arithmetic expression, relation operation expression, bit operation expression, logic operation expression, assigning expression, conditional expression, and the compound expression for a hybrid operation, wherein:

3.1. The arithmetic expression includes arithmetic operation, residual operation, accumulated addition operation, and the accumulated subtraction operation.

3.2. The relation operation expression includes the equality operation and the sequence operation.

3.3. The bitwise operation expression includes the bitwise operation and the shift operation.

4. The program flow control

The program flow control includes three modes of sequence execution, selection execution, and loop execution.

4.1. The sequence execution executes the operations by the running sequence of the programs.

4.2. The selection execution selects one of many program pieces that satisfies the condition to execute operations.

4.3. The loop execution is divided into when-type loop and the until-type loop. The when-type loop firstly judges the value of a conditional expression, executes a program repeatedly when the result is 真 or true, and stops the loop operation until the value of the expression is 假 or false. The until-type cycling firstly executes operations, then judges a conditional expression, and executes the original operations again when the result is true, or stop the loop operation when the result is false.

5. The input/output of data 5.1. The data input refers to input data into computer by the method of encoding and inputting the world character to the computer and its processing devices according to the present invention.

5.2. The output of data is that the data is processed and output by the program.

The program written in world character can be designed by take advantage of the above world character computer program design language.

Computer chip instruction design method in world character

The computer chip instruction design method in world character by machine language with the programming method of world character and its execution manner according to the present invention is described below.

The computer chip instruction design method in world character is as follows: taking Chinese characters, linear characters, alphabets, punctuations, symbols and numbers as the instruction design symbols to design the instructions based on the task to be completed by the computer chip instructions; based on the digital operational encoding method of world character information according to the invention, using the codes of the 4 decimal numerals to indicate a world character; and using 16 binary numbers 0 and 1 to represent the task to be completed by the computer chip.

Based on the above method, the design method of the computer chip instructions is detailed as follows:

1. Using Chinese character, linear characters, alphabets (including kana), numbers, punctuations, and symbols to indicate the task to be completed by the computer chip instructions.

2. Using any 4 decimal numerals to indicate the world characters, numbers, punctuations, and symbols that describe the task to be completed by the machine language; or using 4 decimal numerals to encode the Chinese characters, linear characters, alphabets, words, numbers, punctuations, and symbols that describe the task to be completed by the computer chip instructions based on the digital operational encoding method of world character information according to the present invention.

3. Using 4 binary numbers to represent a decimal numeral and totally using 16 binary numbers to represent 4 decimal numerals by the (programming) method in world character and its execution manner according to the present invention.

Example: the computer chip instructions of Chinese characters include: control class, graph class, and character class instructions.

3.1. The control class instructions

| | Example: | |
|---|---|---|
| value | character | control character |
| 0000 | Null, zero | Null, zero |
| 0008 | ☐ | Enter |
| ... | | |
| value | character | control character |
| 7847 | (line feed) | line feed |

3.2. The graph class instructions

| Example: | |
|---|---|
| value | graph |
| 0081 | ★ |

3.3. The character class instructions

| Example: | |
|---|---|
| value | character |
| 0082 | 中 |

The computer chip instructions in linear characters

The computer chip instructions in linear characters include: the control class, graph class, and character class instructions.

(1). The control class instructions

| | Example: | |
|---|---|---|
| value | character | command character |
| 0000 | (null) (null, zero) | NUL |

(2). The graph class instructions

| Example: | |
|---|---|
| value | graph |
| 0081 | ★ |

(3). The character class instructions

| Example: | |
|---|---|
| value | character |
| 0082 | A |

The computer chip instructions in world character can be designed by taking advantages of the above computer chip instructions design method in world character.

The design method in world character computer operating system and its operation manner The design method in world character computer operating system and its operation method for encoding, inputting and processing the world character by the encoding and input method and its processing device of world character information according to the present invention is described below.

The design method in world character computer operating system and its operation method include: the design method in world character computer operating system and the operation method of world character computer operating system.

1. The design method in world character computer operating system 1.1. Using graphs, Chinese characters, alphabets, kana, punctuations, symbols and numbers as operators to design a computer operating system on the basis of its type, application and task.

1.2. Using the world character to name files and using this world character file name to access the memory address of those files marked with world character in the disk.

1.3. Encoding, inputting, and processing the world characters by the encoding and input method of world character and its processing device according to the present invention.

Based on the above method, the design method in world character computer operating system is classified in detail follows:

The design method of the computer boot basic input/output system (BIOS) and the design method of multi-task operating system after computer boot.

(1). The design method of computer boot basic input/output system (BIOS)

The design method of computer installation basic input/output system (BIOS) is: using world characters to edit the operation commands as menus and tables in lines to display on the screen for selection.

(2). The design method of multi-task operating system after computer boot

The design method of multi-task operating system after computer boot is: using graphs, world characters, numbers to design the operation commands as window to display on the screen for selection.

2. The operating method of world character computer operating system (1). Using mouse, finger, electronic sensing stylus to click, touch, or move world character operators displayed on the screen to complete the operation.

(2). Using the sound control to read in the operation instructions to complete the operations.

(3). Using the keyboard to enter instructions to complete the operations.

The computer operating system can be designed by taking advantages of the design method in world character computer operating system and its operation method.

The design method in world character wireless interface protocol

The design method of wireless interface protocol for inputting the wireless interface protocol encoded with world characters by the digital operational encoding and input method of world character information and its processing device according to the present invention is discussed below.

The design method in world character wireless interface protocol is as follows:

1. Using world characters, numbers, punctuations, symbols to indicate the task to be completed by the wireless interface protocol.

2. Encoding the world characters, numbers, punctuations, symbols that indicate the task to be completed by the wireless interface protocol by the digital operational encoding method of world character information according to the present invention.

3. inputting and processing the codes of world characters, numbers, punctuations, symbols that indicate the task to be completed by the wireless interface protocol by the digital operational encoding and input method of world character information and its processing device according to the present invention.

The design method in world character wireless internet protocol

The design method of wireless internet protocol for inputting the wireless internet protocol encoded with world characters by the digital operational encoding and input method of world character information and its processing device according to the present invention is discussed below.

The design method in world character wireless internet protocol is as follows:

1. Using world characters, numbers, punctuations, symbols to indicate the task to be completed by the wireless internet protocol.

2. Encoding the world characters, numbers, punctuations, symbols that indicate the task to be completed by the wireless internet protocol by the digital operational encoding method of world character information according to the present invention.

3. inputting and processing the codes of the world characters, numbers, punctuations, symbols that indicate the task to be completed by the wireless internet protocol by the digital operational encoding and input method of world character information and its processing device according to the present invention.

Compared to the conventional scheme of digital operational encoding and input method of world character information and its information processing system, the optimized scheme of digital operational encoding and input method of world character information and its information processing device has the following advantages:

1. Use 10 numerals 0-9 in common to perform digital operational encoding to the world character information, and solve the conflict between the simplicity and high efficiency for encoding the world character information in a more effective way.

2. Build up a complete set of methods and systems adapted for the digital operational encoding of world character and inputting into the computer, encoding, sorting and retrieving of world character, programming design in world character, operating system design in world character, chip instruction design in world character, wireless interface protocol design in world character, and wireless internet protocol design in world character.

3. The optimized scheme is enhanced with the operational encoding method of Chinese sentence, realizes the input of "one code for one character", thus making the input of Chinese character more simple and efficient, and satisfying the requirements of the cognitive psychology in a better way.

4. The Japanese operational encoding and input method of the optimized scheme allows to input Japanese word, Kanji character, Japanese Roman word at the same state, solving the problem of low efficiency in the current technologies requiring to toggle among different states to input Japanese word, Kanji character, and Japanese Roman words.

5. The simplified spelling encoding method of linear character in the optimized scheme limits the code length of words within 6, improving the efficiency of encoding, inputting, and retrieving of word.

6. The keyboard settings in the optimized scheme integrates the functions of standard keyboard and mouse. The keyboard of the optimized scheme can be used independent, without the cooperation of the standard keyboard and mouse, better satisfying the requirements of the cognitive psychology and ergonomics, easier for transportation, and producing an improved operation efficiency for the mobile terminal.

Although the present invention has been illustrated in details by means of the preferred embodiment in the forgoing detailed description, those skilled in the art shall understand that the present invention can be embodied in other specific modes without departing from the spirit or scope of the invention. Thus, the embodiments herein disclosed should be considered for the purpose of illustration but not limitation anyway.

Taking the following as an example: the English alphabets shown in FIG. 3 are arranged by areas 0-9, which is an arrangement suited for the using habit, However, they can be arranged in a way meeting the habits of the local users of the language.

As a further example, the arrangement of number keys in FIG. 32 is just a way better meeting the ergonomics and the cognitive psychology, and an arrangement meeting the habits of the local users can be used.

In addition, the computer device of the present invention can be a mobile phone with software, or a PDA (personal digital assistant), or an analoged number key, or a palm computer.

Therefore, the scope of the present invention is only limited by the appending claims but not the above descriptions.

The invention claimed is:

1. A compiling method for computer high-level languages, the method used in a computer device comprising a numerical keypad and a space key arranged proximal to the numerical keypad, the method comprises:
    encoding and inputting world characters for use by computer high-level languages by:
        for each category of the world characters, allocating basic elements that form the world characters of the each category to corresponding number keys on the numerical pad, a code of said each basic element is uniquely determined by an area code and a position code for a number key at which the basic element is located, wherein the area code of the basic element is a number of the key to which the basic element was allocated, and the position code of the basic element is a position number in the respective numerical key to which the basic element was allocated;
    selecting the category of the characters to be input;
    for each world character or each word inputted for the selected category, splitting the word or world character as a combination of some of said basic elements;
    arranging in order the area and position codes corresponding to each element in said combination; and inputting a code of the world character or the word based on the arranged codes using the numerical keypad and the space key proximal to the numerical keypad; and wherein the encoding and the inputting of the world characters is performed by a processing device that comprises one or more of a keyboard, a mouse, a host computer, a monitor, a key display, a printer, a modem, a router, and information exchanging codes, built-in codes, a world character database, font pattern codes, and a font exchanging code.

2. The method of claim 1, wherein the encoding further includes encoding numerals, punctuation, and symbols.

* * * * *